US012623428B2

(12) United States Patent
Ueda et al.

(10) Patent No.: US 12,623,428 B2
(45) Date of Patent: May 12, 2026

(54) DIE CUSHION CONTROL DEVICE, DIE CUSHION CONTROL METHOD, AND STORAGE MEDIUM

(71) Applicant: Mitsubishi Electric Corporation, Tokyo (JP)

(72) Inventors: Koichiro Ueda, Tokyo (JP); Koji Mahara, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 554 days.

(21) Appl. No.: 18/037,324

(22) PCT Filed: Jun. 4, 2021

(86) PCT No.: PCT/JP2021/021414
§ 371 (c)(1),
(2) Date: May 17, 2023

(87) PCT Pub. No.: WO2022/254708
PCT Pub. Date: Dec. 8, 2022

(65) Prior Publication Data
US 2024/0009949 A1 Jan. 11, 2024

(51) Int. Cl.
*B30B 15/14* (2006.01)
*B21D 24/02* (2006.01)
(Continued)

(52) U.S. Cl.
CPC ............ *B30B 15/148* (2013.01); *B21D 24/02* (2013.01); *B30B 15/02* (2013.01); *B30B 15/26* (2013.01)

(58) Field of Classification Search
CPC ....... B30B 15/148; B30B 15/02; B30B 15/26; B30B 15/161; B30B 15/22;
(Continued)

(56) References Cited

U.S. PATENT DOCUMENTS 7,293,447 B2 11/2007 Iwashita et al.
7,406,851 B2 * 8/2008 Shiroza .................. B21D 24/10 72/21.5
(Continued)

FOREIGN PATENT DOCUMENTS

CN 112743907 5/2021
JP 2006-130524 A 5/2006
(Continued)

OTHER PUBLICATIONS

Kono Yasuyuki, JP2017225998A, Dec. 28, 2017, [online]. Translation [retrieved on Dec. 22, 2025] retrieved from internet: machine translation by IP.com. (Year: 2017).*
(Continued)

*Primary Examiner* — Alicia M. Choi
*Assistant Examiner* — Marzia T Monty
(74) *Attorney, Agent, or Firm* — XSENSUS LLP

(57) ABSTRACT

A die cushion control device for controlling a die cushion mechanism includes: a pressure command generation unit that outputs a first pressure command on pressure or force to be generated between the die cushion mechanism and a slide; a deviation prediction unit that predicts a pressure deviation that is the difference between the pressure or the force in the first pressure command and a detected pressure caused when the die cushion mechanism is controlled according to the first pressure command, and outputs the predicted pressure deviation as a correction pressure command; a pressure command correction unit that corrects the first pressure command with the correction pressure command to calculate a second pressure command; and a pressure control unit that calculates a speed command to cause the detected pressure to follow the second pressure command, and outputs the speed command to a speed control unit.

12 Claims, 11 Drawing Sheets

(51) Int. Cl.
*B30B 15/02* (2006.01)
*B30B 15/26* (2006.01)

(58) Field of Classification Search
CPC . B30B 15/0052; B30B 15/0094; B21D 24/02; G05B 19/042
See application file for complete search history.

(56) References Cited

U.S. PATENT DOCUMENTS

| | | | |
|---|---|---|---|
| 7,421,878 B2 | 9/2008 | Iwashita et al. | |
| 11,565,491 B2 | 1/2023 | Shinoda et al. | |
| 2006/0090656 A1 | 5/2006 | Iwashita et al. | |
| 2006/0288755 A1 | 12/2006 | Iwashita et al. | |
| 2010/0207566 A1 | 8/2010 | Iwashita et al. | |
| 2019/0232353 A1* | 8/2019 | Kohno | B21D 24/02 |
| 2021/0129474 A1 | 5/2021 | Shinoda et al. | |

FOREIGN PATENT DOCUMENTS

| | | | |
|---|---|---|---|
| JP | 2006-142351 A | | 6/2006 |
| JP | 2007-000905 A | | 1/2007 |
| JP | 2007-905 A | | 1/2007 |
| JP | 2007-301599 A | | 11/2007 |
| JP | 2010-188363 A | | 9/2010 |
| JP | 2017225998 A | * | 12/2017 |
| JP | 2021-070041 A | | 5/2021 |
| WO | 2009/078237 A1 | | 6/2009 |

OTHER PUBLICATIONS

Office Action issued Jan. 21, 2024 in Chinese Patent Application No. 202180088080.9, 15 pages.
International Search Report and Written Opinion mailed on Aug. 3, 2021, received for PCT Application PCT/JP2021/021414, filed on Jun. 4, 2021, 8 pages including English Translation.
Decision to Grant mailed on Nov. 30, 2021, received for PCT Application 2021-558592, 3 pages including English Translation.

* cited by examiner

DIE CUSHION CONTROL DEVICE, DIE CUSHION CONTROL METHOD, AND STORAGE MEDIUM

CROSS-REFERENCE TO RELATED APPLICATION

The present application is based on PCT filing PCT/JP2021/021414, filed Jun. 4, 2021, the entire contents of which are incorporated herein by reference.

FIELD

The present disclosure relates to a die cushion control device, a die cushion control method, and a die cushion control program for controlling a die cushion mechanism.

BACKGROUND

Machine tools for press forming such as bending, drawing, and blanking include presses with a die cushion mechanism. The die cushion mechanism applies additional pressure to a slide that is a moving-side support member supporting one die, from a cushion pad that is a support member supporting the other die. Thus, the die cushion mechanism can prevent or reduce occurrence of defects such as wrinkles in a press-formed product.

A die cushion mechanism called a servo die cushion uses a servomotor as a drive source and can arbitrarily change additional pressure during one forming process. By using the servo die cushion, presses can improve formability, quality stability, and yield.

In the servo die cushion, pressure during press operation is detected, and the servomotor is controlled so that the pressure follows a predetermined pressure command value. In the servo die cushion, even if pressure control is performed, a phenomenon can occur in which an actual pressure drops against a desired pressure in the final phase of pressurization operation. In this case, the pressure drop becomes a factor that causes wrinkles in a press-formed product due to insufficient additional pressure.

To eliminate this pressure drop phenomenon, a control device of Patent Literature 1 acquires the acceleration of the slide and corrects a speed command value and a current command value instructed to the die cushion mechanism, based on a signal obtained by multiplying the acceleration by a constant.

CITATION LIST

Patent Literature

Patent Literature 1: Japanese Patent Application Laid-open No. 2007-905

SUMMARY

Technical Problem

However, in the technique of Patent Literature 1, if the constant by which the acceleration is multiplied is larger than an appropriate value, overcompensation is made, that is, the pressure becomes larger than a target value of the pressure command value. If the constant is smaller than the appropriate value, the pressure does not reach the target value of the pressure command value, and the pressure drop cannot be sufficiently compensated. Therefore, in the technique of Patent Literature 1, it is required to determine the constant by trial and error to perform compensation so that the pressure reaches the level of the pressure command value. Thus, the compensation for the pressure drop takes time and effort disadvantageously.

The present disclosure has been made in view of the above, and an object thereof is to provide a die cushion control device capable of easily compensating for a pressure drop.

Solution to Problem

In order to solve the above-described problem and achieve the object, the present disclosure is a die cushion control device for controlling a die cushion mechanism that generates pressure or force against a slide of a press using a servomotor as a drive source, the die cushion control device including a pressure command generation unit that outputs a first pressure command that is a command on the pressure or the force to be generated between the die cushion mechanism and the slide. The die cushion control device also includes a deviation prediction unit that acquires information on the pressure or the force generated between the die cushion mechanism and the slide as a detected pressure, predicts a pressure deviation that is the difference between the pressure or the force in the first pressure command and the detected pressure caused when the die cushion mechanism is controlled according to the first pressure command, based on the translational acceleration of the slide, control parameters used when the pressure or the force of the die cushion mechanism is controlled, and a die cushion travel amount per revolution of the servomotor, and outputs the predicted pressure deviation as a correction pressure command. The die cushion control device also includes a pressure command correction unit that corrects the first pressure command with the correction pressure command to calculate a second pressure command, and a pressure control unit that calculates a speed command to cause the detected pressure to follow the second pressure command, and outputs the speed command to a speed control unit that outputs a drive current corresponding to the speed command to the servomotor.

ADVANTAGEOUS EFFECTS OF INVENTION

The die cushion control device according to the present disclosure has the effect of being able to easily compensate for a pressure drop.

DESCRIPTION OF EMBODIMENTS

Hereinafter, a die cushion control device, a die cushion control method, and a die cushion control program according to embodiments of the present disclosure will be described in detail with reference to the drawings.

First Embodiment

Figure 1:
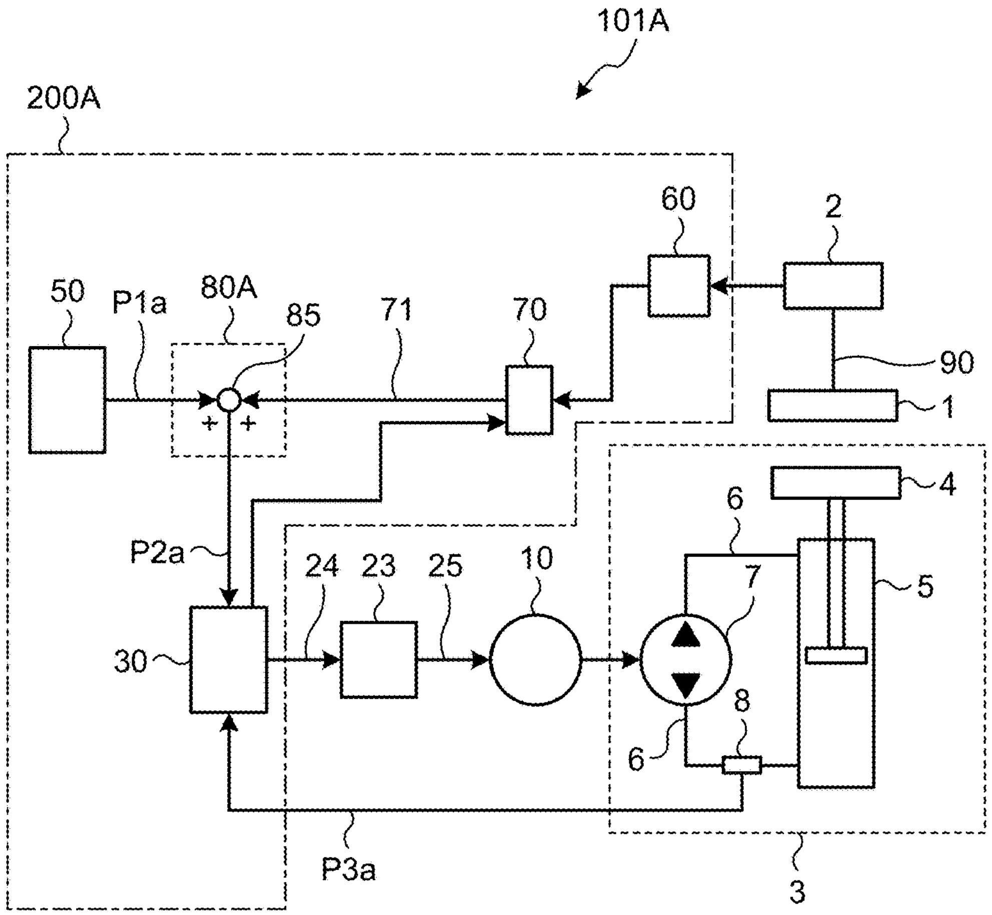
FIG. 1 is a diagram illustrating a configuration of a processing system including a die cushion control device according to a first embodiment.

FIG. 1 is a diagram illustrating a configuration of a processing system including a die cushion control device according to a first embodiment. A processing system 101A is a system that presses a workpiece while changing additional force using a servo die cushion during one forming process. The following describes a case where the additional force is pressure.

The processing system 101A includes a die cushion mechanism 3, a die cushion control device 200A that controls the die cushion mechanism 3, a slide 1, a slide control unit 2, a servomotor 10, a speed control unit 23, and a machine mechanism 90. In the processing system 101A, the machine mechanism 90, the servomotor 10, the die cushion mechanism 3, and the slide 1 are components of a press.

The processing system 101A includes two dies (not illustrated). The slide 1 is a support member that supports one die (an upper die in FIG. 1). The slide 1 is equipped with a slide drive motor (not illustrated). The rotational motion of the slide drive motor is converted into up-and-down motion via the machine mechanism 90 such as a crank mechanism.

The die cushion mechanism 3 uses the servomotor as a drive source, and generates force against the slide 1 of the press via a cushion pad 4 and a workpiece (not illustrated). The die cushion mechanism 3 includes the cushion pad 4, a hydraulic cylinder 5, pipes 6, a hydraulic pump 7, and a pressure detector 8 that is a pressure detection unit. The cushion pad 4 is a support member that supports the other die of the two dies. In the press, the slide 1 is pressed against the workpiece from above the workpiece, and the cushion pad 4 applies additional pressure to the workpiece from below the workpiece. In the press, the slide 1 may be pressed against the workpiece from below the workpiece. In this case, the cushion pad 4 applies additional pressure to the workpiece from above the workpiece. The workpiece is a part being worked on, that is, a target object of pressing, what is called a press workpiece, a press-formed workpiece, or the like. The workpiece is processed by the press and formed into a press-formed product.

The cushion pad 4 moves in accordance with the movement of the slide 1. The cushion pad 4 is controlled so that a specific pressure is generated on the workpiece when the slide 1 descends and the slide 1 comes into contact with the cushion pad 4 via the workpiece. The cushion pad 4 is controlled based on a pressure value detected by the pressure detector 8 (hereinafter, referred to as a detected pressure P3*a*).

The hydraulic cylinder 5 drives the cushion pad 4 in the up-and-down directions. The hydraulic pump 7 is a bidirectionally-rotating rotary pump. The hydraulic pump 7 is connected to the hydraulic cylinder 5 via the two pipes 6. The hydraulic pump 7 supplies hydraulic fluid to the hydraulic cylinder 5 via the pipes 6. The pressure detector 8 is provided in one of the pipes 6 and detects pressure in the pipe 6. The pressure detector 8 sends the detected pressure P3*a* that is a detected pressure value to the die cushion control device 200A.

Although the first embodiment describes a case where the pressure detector 8 is provided in the pipe 6, the pressure detector 8 may be any device as long as the device can detect pressure generated between the slide 1 and the die cushion mechanism 3.

The servomotor 10 drives the hydraulic pump 7. The servomotor 10 supplies torque for driving the hydraulic pump 7 to the hydraulic pump 7. The servomotor 10 is controlled by the die cushion control device 200A. The machine mechanism 90 is, for example, a link mechanism that converts rotational motion into linear motion. An example of the link mechanism is a crank mechanism.

The slide control unit 2 controls the slide 1 by controlling the slide drive motor. The slide control unit 2 controls the travel amount of the slide 1, slide speed that is the speed of the slide 1, etc. The slide control unit 2 causes the slide 1 to move up and down for pressing. The slide control unit 2 sends state information indicating the state of the slide 1 to a slide acceleration calculator 60.

The die cushion control device 200A controls the 10 servomotor 10 based on the detected pressure P3*a* detected by the pressure detector 8, thereby controlling the cushion pad 4. The die cushion control device 200A includes a pressure command generation unit 50, the slide acceleration calculator 60, a deviation prediction unit 70, a pressure command correction unit 80A, and a pressure control unit 30.

The slide acceleration calculator 60 calculates slide acceleration that is information on the translational acceleration of the slide 1, based on the state information 20 from the slide control unit 2. The state information is, for example, the rotational position of the slide drive motor during pressing. In this case, the slide acceleration calculator 60 acquires, as the state information, the rotational position of the slide drive motor during pressing from the slide control unit 2. The slide acceleration calculator 60 calculates the translational position of the slide 1, using the rotational position, information on the link mechanism, machine specifications, etc., and differentiates the translational position twice, thereby calculating the slide acceleration indicated by a translational acceleration signal.

Another example of the state information is a translational position command generated by the slide control unit 2 when the slide 1 moves. In this case, the slide acceleration calculator 60 acquires, as the state information, the translational position command from the slide control unit 2. The slide acceleration calculator 60 differentiates the translational position corresponding to the translational position command twice, thereby calculating the slide acceleration indicated by a translational acceleration signal. The slide acceleration calculator 60 sends the calculated slide acceleration to the deviation prediction unit 70.

The deviation prediction unit 70 calculates a pressure deviation that is the quantity of a pressure drop in a steady-state that occurs at the time of pressure control on the cushion pad 4, based on the slide acceleration, control parameters used by the pressure control unit 30, and a die cushion travel amount per revolution of the servomotor 10. The pressure deviation is the pressure difference between a pressure specified by a first pressure command P1*a* to be described later and a pressure specified by the detected pressure P3*a* when the pressure control unit 30 controls the pressure of the die cushion mechanism 3 using the first pressure command P1*a*.

When the pressure control unit 30 performs proportional-integral (PI) control, the deviation prediction unit 70 predicts the pressure deviation by formula (1) below, using control parameters of the PI control. In formula (1), PD is the pressure deviation, and $A_{sl}$ is the slide acceleration. $K_p$ is the proportional gain of the pressure control (a control parameter of the pressure control), and $K_i$ is the integral gain of the pressure control (a control parameter of the pressure control). C is the amount of translation of the die cushion mechanism 3 per revolution of the servomotor 10 (hereinafter, referred to as the die cushion travel amount).

Formula 1:

$$PD=(1/K_p/K_i/C)+A_{sl} \tag{1}$$

As shown in formula (1), the deviation prediction unit 70 divides the slide acceleration $A_{sl}$ by the proportional gain $K_p$, the integral gain $K_i$, and the die cushion travel amount C per revolution of the servomotor thereby predicting the pressure deviation.

When the die cushion mechanism 3 includes the hydraulic cylinder 5 and the hydraulic pump 7 as illustrated in FIG. 1, C can be expressed as "C=the discharge volume of the hydraulic fluid per revolution of the hydraulic pump 7/the pressure-receiving cross-sectional area of the hydraulic cylinder 5". The deviation prediction unit 70 sends, to the pressure command correction unit 80A, a correction pressure command 71 that is a command to correct the first pressure command P1*a* so as to reduce the calculated pressure deviation. The correction pressure command 71 is a command including information on a correction pressure corresponding to the pressure deviation.

The pressure command generation unit 50 generates a desired pressure profile to be generated by the die cushion mechanism 3 at the time of pressing. The pressure profile is information indicating time and the magnitude of pressure to be applied to the workpiece by the cushion pad 4. In pressing, it is predetermined for each workpiece how much pressure is applied to the workpiece and for how long. Thus, a user of the press sets a pressure of pressing and a duration of pressing, so that a pressure profile for each workpiece desired by the user is determined. The pressure command generation unit 50 generates a pressure command corresponding to the pressure profile (hereinafter, referred to as the first pressure command P1*a*) and sends the first pressure command P1*a* to the pressure command correction unit 80A.

The pressure command correction unit 80A includes an adder 85 that sums the first pressure command P1*a* and the correction pressure (pressure deviation) included in the correction pressure command 71, thereby generating a pressure command (hereinafter, referred to as a second pressure command P2*a*). The pressure command correction unit 80A uses the second pressure command P2*a* as a pressure command for the pressure control unit 30 and sends the second pressure command P2*a* to the pressure control unit 30. For example, the pressure command correction unit 80A applies the second pressure command P2*a* after the first pressure command P1*a* rises and the first pressure command P1*a* becomes a constant value.

The pressure control unit 30 calculates a command to be used when the speed of the servomotor 10 is controlled (hereinafter, referred to as a motor speed command 24), based on the second pressure command P2*a* and the detected pressure P3*a*. The pressure control unit 30 calculates the motor speed command 24 corresponding to a speed at which the servomotor 10 is caused to drive so that the detected pressure P3*a* follows the second pressure command P2*a*. Here, a specific configuration example of the pressure control unit 30 will be described.

Figure 2:
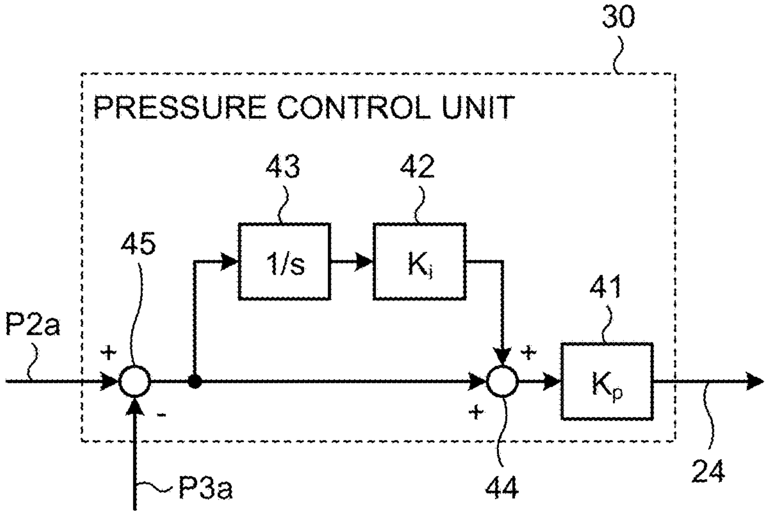
FIG. 2 is a diagram illustrating a configuration of a pressure control unit included in the die cushion control device according to the first embodiment.

FIG. 2 is a diagram illustrating a configuration of the pressure control unit included in the die cushion control device according to the first embodiment. The pressure control unit 30 includes a multiplier 41 that does multiplication by the proportional gain $K_p$, a multiplier 42 that does multiplication by the integral gain $K_i$, an integrator 43, an adder 44, and a subtracter 45.

The pressure control unit 30 receives the second pressure command P2*a* from the pressure command correction unit 80A and receives the detected pressure P3*a* from the pressure detector 8. The pressure control unit 30 subtracts the detected pressure P3*a* from the second pressure command P2*a* to calculate the deviation between the pressure indicated by the second pressure command P2*a* and the pressure indicated by the detected pressure P3*a*, and performs proportional control processing and integral control processing on the deviation to calculate the motor speed command 24.

Specifically, the subtracter 45 subtracts the pressure indicated by the detected pressure P3*a* from the pressure indicated by the second pressure command P2*a* to calculate the deviation between the pressure indicated by the second pressure command P2*a* and the pressure indicated by the detected pressure P3*a*. The integrator 43 integrates the deviation calculated by the subtracter 45. "s" illustrated in the integrator 43 represents the Laplace operator, meaning that integral processing is performed using 1/s.

The multiplier 42 multiplies the integrated deviation by the integral gain $K_i$, which is a control parameter. The adder 44 adds the result of the multiplication by the multiplier 42 and the result of the subtraction by the subtracter 45. The multiplier 41 multiplies the result of the addition by the adder 44 by the proportional gain $K_p$, which is a control parameter, and outputs the multiplication result as the motor speed command 24.

The speed control unit 23 sends a drive current corresponding to the motor speed command 24 to the servomotor 10. That is, the speed control unit 23 supplies the drive current 25 to the servomotor 10 so that the speed of the servomotor 10 follows a speed indicated by the motor speed command 24.

Although not illustrated in FIG. 1, the servomotor 10 is equipped with an encoder to detect the rotational speed of the servomotor 10. The speed control unit 23 may create feedback control so that the rotational speed detected by the encoder follows the motor speed command 24, to calculate the drive current 25.

Figure 3:
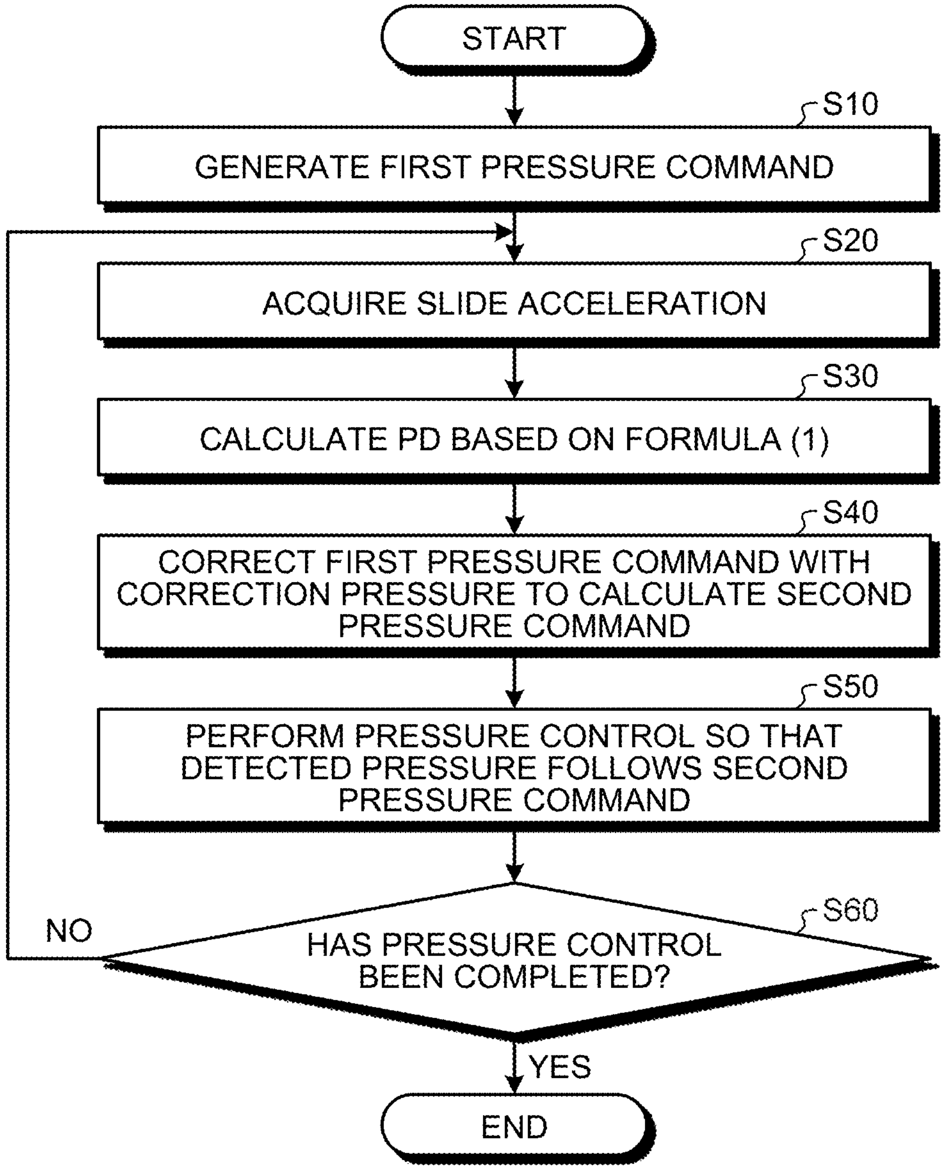
FIG. 3 is a flowchart illustrating a procedure for controlling a die cushion mechanism by the die cushion control device according to the first embodiment.

Next, a procedure for controlling the die cushion mechanism 3 by the die cushion control device 200A will be described. FIG. 3 is a flowchart illustrating the procedure for controlling the die cushion mechanism by the die cushion control device according to the first embodiment.

In the die cushion control device 200A, the pressure command generation unit 50 generates the first pressure command P1*a* corresponding to a pressure profile to be generated by the die cushion mechanism 3 at the time of pressing (step S10), and sends the first pressure command P1*a* to the pressure command correction unit 80A.

The slide acceleration calculator 60 acquires the slide acceleration (step S20). Specifically, the slide acceleration calculator 60 calculates the slide acceleration based on the state information on the slide 1 transmitted from the slide control unit 2.

The deviation prediction unit 70 calculates PD, which is the pressure deviation, based on formula (1) (step S30). Specifically, based on the slide acceleration, the control parameters used by the pressure control unit 30, and the die cushion travel amount per revolution of the servomotor 10, the deviation prediction unit 70 calculates the pressure deviation, which is the quantity of a steady-state pressure drop that occurs at the time of pressure control on the cushion pad 4. The deviation prediction unit 70 calculates a correction pressure for reducing the pressure deviation calculated, and sends the correction pressure command 71 including the calculated correction pressure to the pressure command correction unit 80A.

The pressure command correction unit 80A corrects the first pressure command P1*a* with the correction pressure included in the correction pressure command 71, to calculate the second pressure command P2*a* (step S40). The first pressure command P1*a* after correction is the second pressure command P2*a*. The pressure command correction unit 80A sends the second pressure command P2*a* to the pressure control unit 30.

The pressure control unit 30 acquires the detected pressure P3*a* from the pressure detector 8. The pressure control unit 30 constantly performs processing to acquire the detected pressure P3*a* from the pressure detector 8. The pressure control unit 30 performs pressure control so that the detected pressure P3*a* follows the second pressure command P2*a* (step S50). Specifically, the pressure control unit 30 calculates the motor speed command 24 based on the second pressure command P2*a* and the detected pressure P3*a*. The speed control unit 23 supplies the drive current 25 to the servomotor 10 so that the speed of the servomotor 10 follows the motor speed command 24. Thus, the pressure control unit 30 and the speed control unit 23 control the servomotor 10 connected to the die cushion mechanism 3, using the second pressure command P2*a* and the detected pressure P3*a*.

The die cushion control device 200A determines whether or not the pressure control has been completed (step S60). When the pressure control has not been completed (step S60, No), the die cushion control device 200A returns to the processing in step S20 and repeats the processing in steps S20 to S60. While the pressure command generation unit 50 remain in generating the first pressure command P1*a* and sending the first pressure command P1*a* to the pressure command correction unit 80A, the pressure control has not been completed. When the pressure control has been completed (step S60, Yes), the pressure command generation unit 50 ends the generation of the first pressure command P1*a*. Consequently, the die cushion control device 200A finishes operation related to the pressure control.

Figure 4:
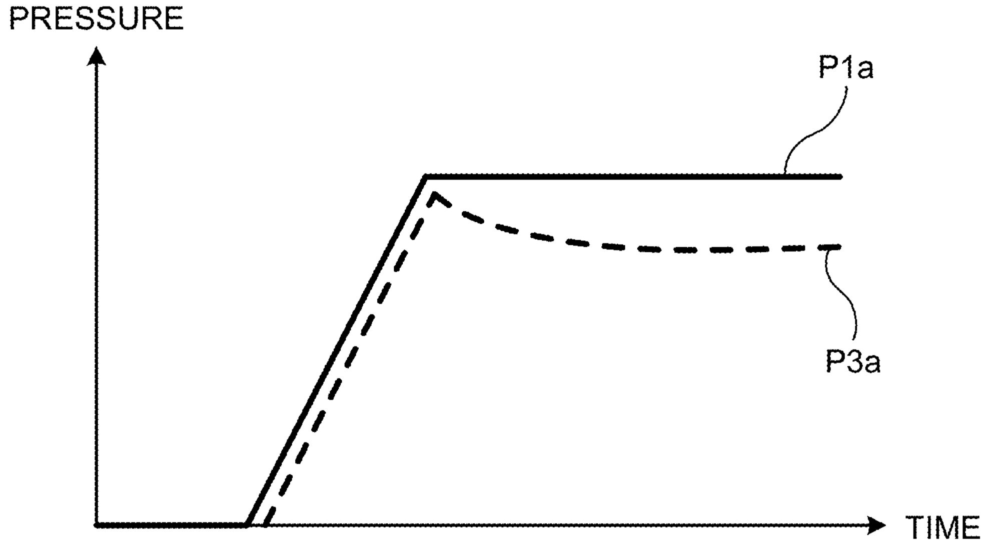
FIG. 4 is a diagram for explaining pressure waveforms when a die cushion control device of a comparative example controls the die cushion mechanism.

Here, effects obtained by the die cushion control device 200A controlling the die cushion mechanism 3 will be described with reference to FIGS. 4 and 5. FIG. 4 is a diagram for explaining pressure waveforms when a die cushion control device of a comparative example controls the die cushion mechanism. The horizontal axis of a graph illustrated in FIG. 4 represents time, and the vertical axis represents pressure.

The die cushion control device of the comparative example is a device that applies the first pressure command P1*a* directly to the pressure control unit as a pressure command for pressure control. FIG. 4 illustrates a waveform of the first pressure command P1*a* indicated by a solid line and a waveform of the detected pressure P3*a* indicated by a broken line.

When a pressure profile to be generated by the die cushion mechanism 3 is directly applied as the first pressure command P1*a* and is applied to the pressure control of the die cushion mechanism 3, the detected pressure P3*a* does not follow the first pressure command P1*a*, and a waveform dropping against the first pressure command P1*a* is generated as illustrated in FIG. 4.

Figure 5:
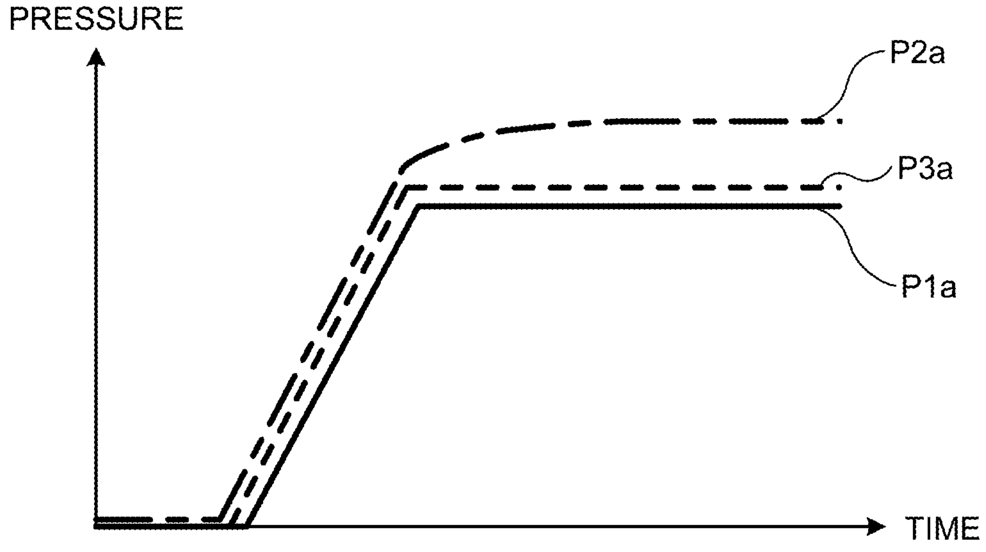
FIG. 5 is a diagram for explaining pressure waveforms when the die cushion control device according to the first embodiment controls the die cushion mechanism.

FIG. 5 is a diagram for explaining pressure waveforms when the die cushion control device according to the first embodiment controls the die cushion mechanism. The horizontal axis of a graph illustrated in FIG. 5 represents time, and the vertical axis represents pressure. FIG. 5 illustrates a waveform of the first pressure command Pla indicated by a solid line, a waveform of the detected pressure P3*a* indicated by a broken line, and a waveform of the second pressure command P2*a* indicated by a dash-dotted line.

The die cushion control device 200A quantitatively predicts a pressure drop, corrects the first pressure command P1*a* with the correction pressure command 71 corresponding to the quantity of the pressure drop (a pressure drop prediction value) in anticipation of the quantity of the drop, and generates the second pressure command P2*a* to be applied to the pressure control. Consequently, the die cushion control device 200A can obtain a waveform of the detected pressure P3*a* that does not drop against the first pressure command P1*a*, which is a pressure profile to be generated by the die cushion mechanism 3.

The die cushion control device 200A sets a pressure profile to be applied at the time of pressing as the first pressure command P1*a*. Thus, the die cushion control device 200A can prevent overcompensation by which the detected pressure P3*a* becomes larger than the first pressure command P1*a*, or conversely, insufficient compensation by which the detected pressure P3*a* does not reach the first pressure command P1*a*. Consequently, the die cushion control device 200A can automatically control the pressure of the die cushion mechanism 3 according to a desired pressure profile in the steady state.

When generating the second pressure command P2*a*, the die cushion control device 200A can obtain a correction pressure that is a correction signal of an appropriate level that is not too large or too small, that is, the correction pressure command 71, without requiring the user operations such as adjusting some coefficient.

Further, when the die cushion control device 200A calculates the correction pressure command 71 including a correction pressure with which the first pressure command P1*a* is corrected by formula (1) which is a prediction formula (correction formula), formula (1) does not depend on specification values related to the workpiece and the dies. This eliminates the need to input these specification values to the die cushion control device 200A to change formula (1) every time the workpieces or the dies are changed, and can reduce efforts made by the user.

Here, a description is given of the cause of the detected pressure P3*a* dropping against the first pressure command P1*a* when the slide 1 comes into contact with the cushion pad 4 via the workpiece.

Figure 6:
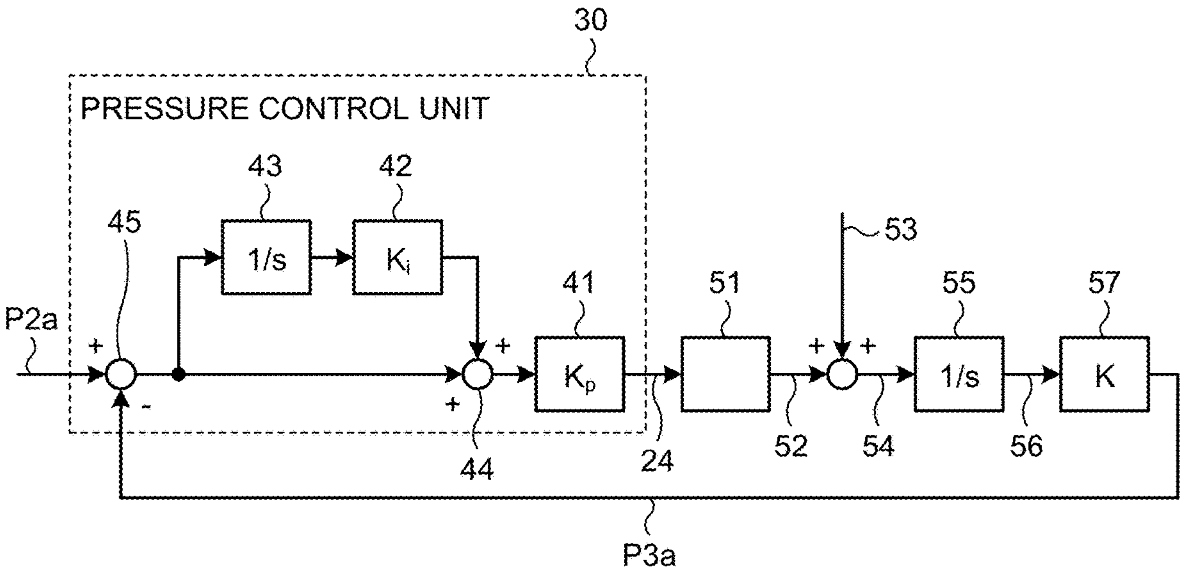
FIG. 6 is a diagram for explaining transfer characteristics at the time of pressure control by the die cushion control device according to the first embodiment.

FIG. 6 is a diagram for explaining transfer characteristics at the time of pressure control by the die cushion control device according to the first embodiment. For components in FIG. 6, components that achieve the same functions as the components illustrated in FIG. 2 are denoted by the same reference numerals, without duplicated explanations.

The pressure control unit 30 performs a PI control operation on the difference between the second pressure command P2*a* and the detected pressure P3*a* so that the detected pressure P3*a* follows the second pressure command P2*a*, to calculate and output the motor speed command 24.

A transfer characteristic 51 illustrated in FIG. 6 represents a transfer characteristic from the motor speed command 24 to a motor speed 52 that is the speed of the servomotor 10. The transfer characteristic 51 corresponds to a transfer characteristic that depends on the characteristics of the speed control unit 23 and the servomotor 10 in FIG. 1. Here, it is considered that the control band of pressure control is sufficiently smaller than the control band of speed control, and the transfer characteristic of speed control is approximately one, to describe the pressure drop.

In die cushion control, the motor speed 52 of the servomotor 10 does not depend only on the speed command generated by the pressure control unit 30. After the slide 1 comes into contact with the die cushion mechanism 3 via the workpiece, the servomotor 10 is forcibly rotated also by the external force of the slide 1. This movement can be regarded as the reception of speed disturbance according to the movement of the slide 1 when viewed from the pressure control for controlling the servomotor 10 driving the die cushion mechanism 3. A disturbance velocity 53 illustrated in FIG. 6 represents this movement in terms of the transfer characteristics. Thus, a motor speed 54 of the servomotor can be considered to be determined by the sum of the motor speed 52 based on the motor speed command 24 generated by the pressure control unit 30 and the disturbance velocity 53 caused by the external force of the slide 1.

A transfer characteristic 55 illustrated in FIG. 6 is a transfer characteristic from the motor speed 54 to a motor position 56. The transfer characteristic 55 can be expressed by 1/s as an integral characteristic. A transfer characteristic 57 illustrated in FIG. 6 is a transfer characteristic from the motor position 56 to the detected pressure P3*a*. These transfer characteristics 55 and 57 correspond to transfer characteristics that depend on the characteristics of the servomotor 10 and the die cushion mechanism 3 in FIG. 1.

In the die cushion mechanism 3, the pressure is generated in proportion to the motor position 56. K of the transfer characteristic 57 represents an elastic constant that is a proportionality constant. K of the transfer characteristic 57 is a constant depending on the compressibility of the dies, the workpiece, or the hydraulic fluid used in the hydraulic cylinder 5.

The detected pressure P3*a* is a signal that depends on the transfer characteristics 51, 55, and 57, the motor speed command 24, and the disturbance velocity 53. Then, the detected pressure P3*a* detected is sent to the pressure control unit 30.

When the slide 1 and the die cushion mechanism 3 perform press-forming, the die cushion mechanism 3 operates to apply pressure to the slide 1. Thus, after the slide 1 descends and the die cushion mechanism 3 comes into contact with the slide 1 via the workpiece, the translational velocity of the slide 1 substantially matches the translational velocity of the die cushion mechanism 3.

In this case, a relationship in that "the translational velocity of the die cushion mechanism 3"=C×(the rotational speed of the servomotor 10 driving the die cushion mechanism 3)", is satisfied between the translational velocity of the die cushion mechanism 3 and the motor rotational speed of the servomotor 10 driving the die cushion mechanism 3.

Here, C is a constant and is the die cushion travel amount per revolution of the servomotor 10 as described above. The constant C is a constant uniquely determined when the specifications of the die cushion mechanism 3 are determined. When this relationship between the translational velocity of the die cushion mechanism 3 and the rotational speed of the servomotor 10 is used, a relationship in that "the motor speed=(1/C)×the slide translational velocity" is satisfied between the motor speed 54 of the servomotor 10 driving the die cushion mechanism 3 and the translational velocity of the slide 1, after the die cushion mechanism 3 comes into contact with the slide 1 via the workpiece. Thus, a disturbance velocity $V_d$ can be given by formula (2) below, where a translational velocity $V_{sl}$ is the translational velocity of the slide 1.

Formula 2:

$$V_d=1/C\times V_{sl} \tag{2}$$

When the transfer characteristics exerted on the detected pressure P3*a*, which is denoted as P, by the disturbance velocity 53 expressed as $V_d$ and the second pressure command P2*a* are calculated based on the block diagram illustrated in FIG. 6, a relationship of formula (3) below is given, where $P_{cmd}$ is the first pressure command P1*a*.

Formula 3

$$P=\frac{K\cdot K_p\cdot s+K\cdot K_p\cdot K_i}{s^2+K\cdot K_p\cdot s+K\cdot K_p\cdot K_i}P_{cmd}+\frac{K\cdot s}{s^2+K\cdot K_p\cdot s+K\cdot K_p\cdot K_i}V_d \tag{3}$$

Furthermore, when formula (2) described above is used in formula (3), a relationship of formula (4) below is given.

Formula 4

$$P=\frac{K\cdot K_p\cdot s+K\cdot K_p\cdot K_i}{s^2+K\cdot K_p\cdot s+K\cdot K_p\cdot K_i}P_{cmd}+\frac{1}{C}\frac{K}{s^2+K\cdot K_p\cdot s+K\cdot K_p\cdot K_i}(s\cdot V_{sl}) \tag{4}$$

"$s\cdot V_{sl}$" in formula (4) can be regarded as a signal obtained by differentiating the translational velocity $V_{sl}$ of the slide 1, and thus is the acceleration of the slide 1. That is, by using the slide acceleration $A_{sl}$, which is the acceleration of the slide 1, a relationship of formula (5) below is given by formula (4).

Formula 5

$$P = \frac{K \cdot K_p \cdot s + K \cdot K_p \cdot K_i}{s^2 + K \cdot K_p \cdot s + K \cdot K_p \cdot K_i} P_{cmd} + \frac{1}{C} \frac{K}{s^2 + K \cdot K_p \cdot s + K \cdot K_p \cdot K_i} A_{sl} \quad (5)$$

To consider the cause of the pressure drop, consider the behavior of steady state response of the transfer characteristics expressed in formula (5) after a lapse of some time from when the pressure command $P_{cmd}$ takes a constant value. First, the steady state response of a transfer function appearing in the first term of formula (5) is determined. A steady-state value appearing in the first term can be calculated by substituting s=0 into the first term of formula (5), and is $P_{cmd}$. Likewise, the steady state response of a transfer function appearing in the second term of formula (5) is determined. By substituting s=0 into the second term of formula (5), a steady state gain=$1/(C \cdot K_p \cdot K_i) \cdot A_{sl}$. Thus, in the steady state, the detected pressure P is given by formula (6) below.

Formula 6:

$$P = P_{cmd} + 1/(C \cdot K_p \cdot K_i) \cdot A_{sl} \quad (6)$$

As shown in formula (6), the detected pressure P does not match the pressure command $P_{cmd}$, causing a deviation of a value obtained by multiplying the slide acceleration $A_{sl}$ by $1/(C \cdot K_p \cdot K_i)$. When the slide 1 performs press operation, the slide 1 decelerates and stops at the bottom dead center. Thus, the slide acceleration $A_{sl}$ decreases, and the slide acceleration $A_{sl}$ has a negative value. Consequently, in formula (6), the detected pressure P has a value smaller than the pressure command $P_{cmd}$, and the detected pressure P drops against the pressure command $P_{cmd}$.

The deviation prediction unit 70 calculates the amount of correction corresponding to the pressure drop, that is, the correction pressure command 71, based on the pressure control characteristics of the die cushion mechanism 3 as described above. Then, the pressure command correction unit 80A corrects the first pressure command P1*a*, which is a desired pressure command, with the correction pressure command 71 in anticipation of the pressure drop at the time of the pressure control, to generate the second pressure command P2*a*. The pressure command correction unit 80A applies the generated second pressure command $P2_a$ to the pressure command for the pressure control. This allows the die cushion control device 200A to obtain pressure according to the desired pressure command (first pressure command P1*a*) in the steady state.

The first embodiment has described the example in which the servomotor 10 rotates the hydraulic pump 7 that is a bidirectional rotary pump, thereby moving the hydraulic cylinder 5 to control the die cushion mechanism 3. However, the processing system 101A is not limited to the configuration where the die cushion mechanism 3 is controlled by the hydraulic cylinder 5. For example, the die cushion control device 200A is also applicable when the die cushion mechanism 3 is driven by a ball screw, the ball screw is connected to the rotational motion of the servomotor 10 via any type of speed reducer, pulleys, a timing belt, etc., and the rotational motion of the servomotor 10 is converted into the translational motion of the die cushion mechanism 3.

Figure 7:
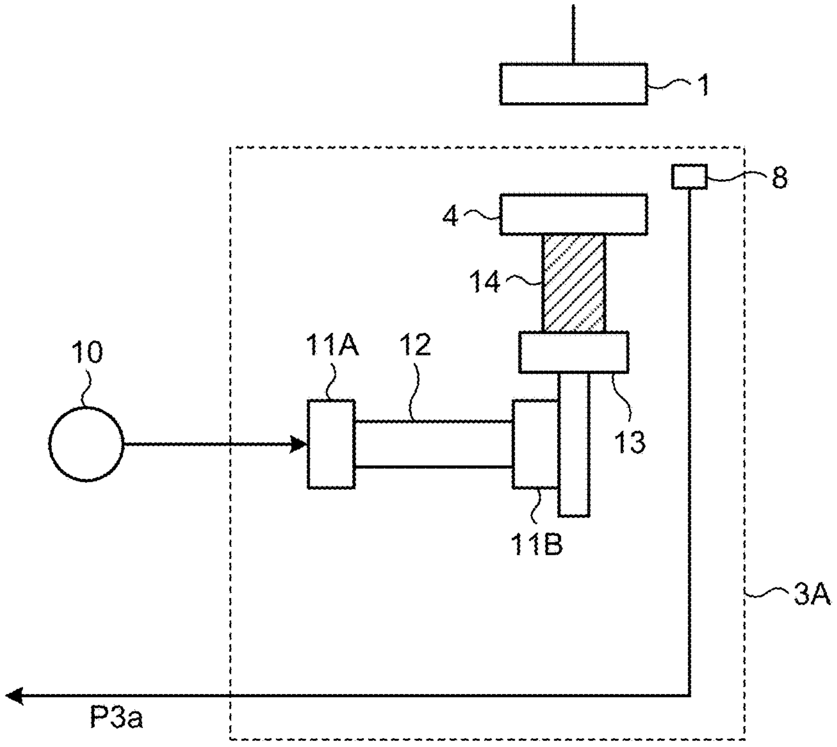
FIG. 7 is a diagram illustrating another configuration example of a processing system included in the die cushion control device according to the first embodiment.

FIG. 7 is a diagram illustrating another configuration example of a processing system included in the die cushion control device according to the first embodiment. A die cushion mechanism 3A of the other configuration example includes pulleys 11A and 11B, a timing belt 12, a speed reducer 13, a ball screw 14, the cushion pad 4, and the pressure detector 8.

For example, in the die cushion mechanism 3A, the cushion pad 4 is driven by the ball screw 14, and the ball screw 14 is connected to the servomotor 10 via the speed reducer 13, the pulley 11B, the timing belt 12, the pulley 11A, etc. Thus, the rotational motion of the servomotor 10 is converted into the translational motion of the die cushion mechanism 3A. The die cushion control device 200A is also applicable to the die cushion mechanism 3A like this.

In this case, C representing the die cushion travel amount per revolution of the servomotor 10 can be calculated from the pitch of the ball screw (the travel amount of the ball screw per revolution), the reduction ratio of the speed reducer, the pulley ratio of the timing belt, etc., to be applied to formula (1). Specifically, when the ball screw, the speed reducer, and the timing belt are used, C=the pitch of the ball screw/the reduction ratio/the pulley ratio. When the ball screw and the speed reducer are used, C=the pitch of the ball screw/the reduction ratio. When the ball screw and the timing belt are used, C=the pitch of the ball screw/the pulley ratio. This allows the die cushion control device 200A to obtain the same effects as those of where the die cushion mechanism 3 is controlled by the hydraulic cylinder 5.

The first embodiment has described the example in which the pressure control unit 30 consists of the components that perform PI control, and calculates the steady-state deviation in the pressure control as in formula (1) using the proportional gain $K_p$ and the integral gain $K_i$, which are the control parameters. However, the control by the pressure control unit 30 is not limited to PI control. The pressure control unit 30 may consist of components that perform proportional-integral-differential (PID) control, or may consist of components that perform control combining phase-lag compensation, phase-lead compensation, etc. Even in these situations, the deviation prediction unit 70 is applicable to the first embodiment by predicting the pressure deviation using control parameters of the pressure control.

As described above, in the first embodiment, the deviation prediction unit 70 calculates the pressure deviation that is the quantity of the pressure drop in the steady-state that occurs at the time of the pressure control on the cushion pad 4, based on the control parameters used by the pressure control unit 30 and the die cushion travel amount per revolution of the servomotor 10. The pressure command correction unit 80A sums the first pressure command P1*a* and the correction pressure (pressure deviation) included in the correction pressure command 71, thereby generating the second pressure command P2*a*. Then, the pressure control unit 30 calculates the motor speed command 24 to be used when the speed of the servomotor 10 is controlled, based on the second pressure command P2*a* and the detected pressure P3*a*, and causes the speed control unit 23 to control the die cushion mechanism 3. Consequently, the die cushion control device 200A can generate the second pressure command P2*a* to handle the pressure drop at the time of pressing in the die cushion mechanism 3, and thus can easily compensate for the pressure drop at the time of pressing.

Furthermore, according to the first embodiment, the die cushion control device 200A can calculate the correction pressure command 71 independently of K of the transfer characteristic 57 described in FIG. 6, that is, the elastic constant. Therefore, even when the dies, the workpiece, or the hydraulic fluid used in the hydraulic cylinder 5 is changed, the die cushion control device 200A can be applied without reflecting these specifications.

In the first embodiment and second and third embodiments described later, a description is given of an example in which pressure is detected, and control is performed based on a detected pressure value. However, force may be detected instead of pressure, and control may be performed based on the force. That is, the die cushion control device 200A and a die cushion control device 200B to be described later may detect force generated between the die cushion mechanism 3 or 3A and the slide 1 instead of pressure, and control the die cushion mechanism 3 or 3A based on the detected force. Even in this case, the die cushion control devices 200A and 200B can be applied to the control of the die cushion mechanism 3 in substantially the same way. Thus, pressure in the first to third embodiments means pressure or force.

Second Embodiment

Next, the second embodiment will be described with reference to FIGS. 8 to 10. In the first embodiment described above, the die cushion control device 200A quantitatively predicts the steady-state deviation of pressure in the pressure control caused by the slide 1 coming into contact with the die cushion mechanism 3 via the workpiece, and corrects the first pressure command P1*a* by the quantity of the predicted pressure deviation, that is, in anticipation of the quantity of the pressure drop. Thus, the die cushion control device 200A eliminates the pressure drop in the steady state while avoiding overcompensation and insufficient compensation.

When the die cushion control device 200A performs the pressure control on the die cushion mechanism 3, a pressure overshoot in the detected pressure P3*a* may occur at the rise of the first pressure command P1*a*, depending on a forming condition such as a high slide speed. A pressure overshoot of moderate magnitude does not exert an effect at the time of pressing. However, occurrence of an excessive pressure overshoot can exert an adverse effect such as producing a crack in a press-formed product. When the pressure overshoot cannot be ignored, if the first pressure command P1*a* is corrected to become larger than the pressure profile in anticipation of the pressure drop as described in the first embodiment, the pressure overshoot further increases. In the second embodiment, pressure control on the die cushion mechanism 3 is performed while preventing such a pressure overshoot from being increased.

Figure 8:
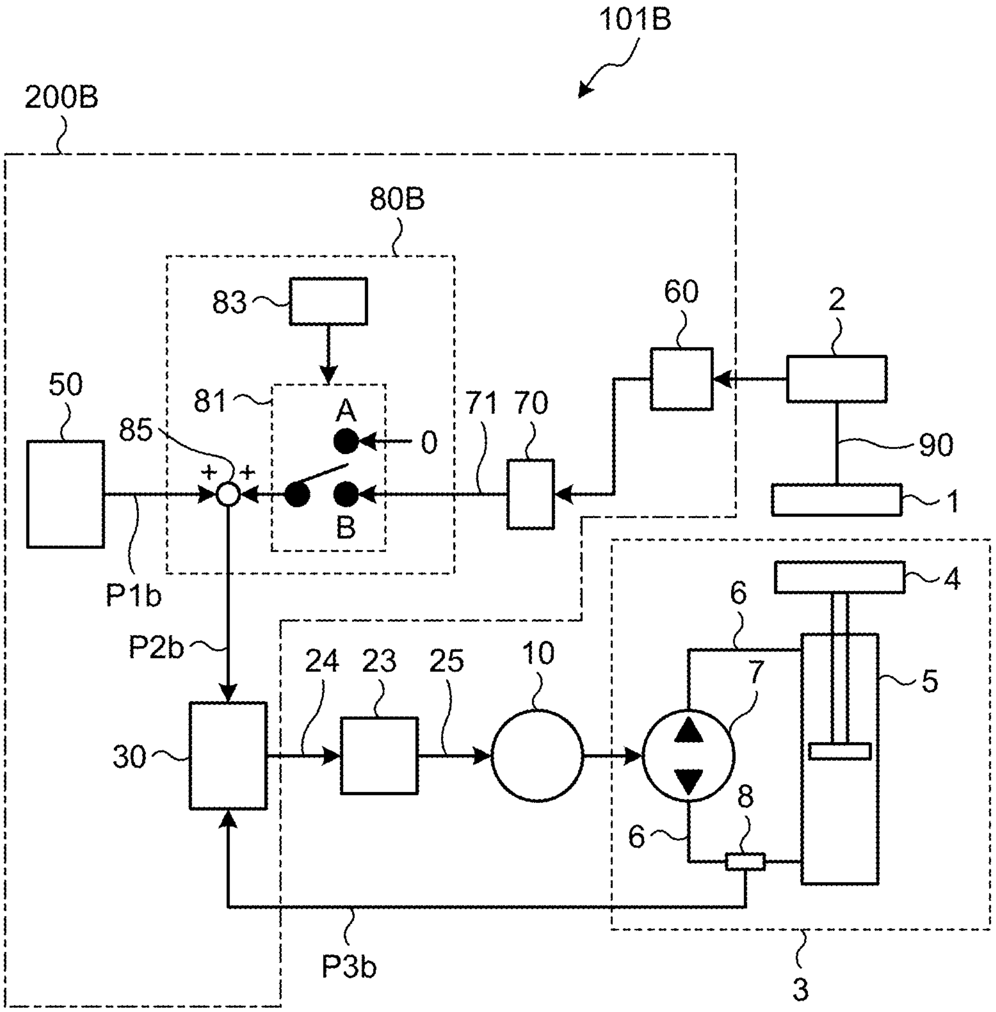
FIG. 8 is a diagram illustrating a configuration of a processing system including a die cushion control device according to a second embodiment.
Figure 9:
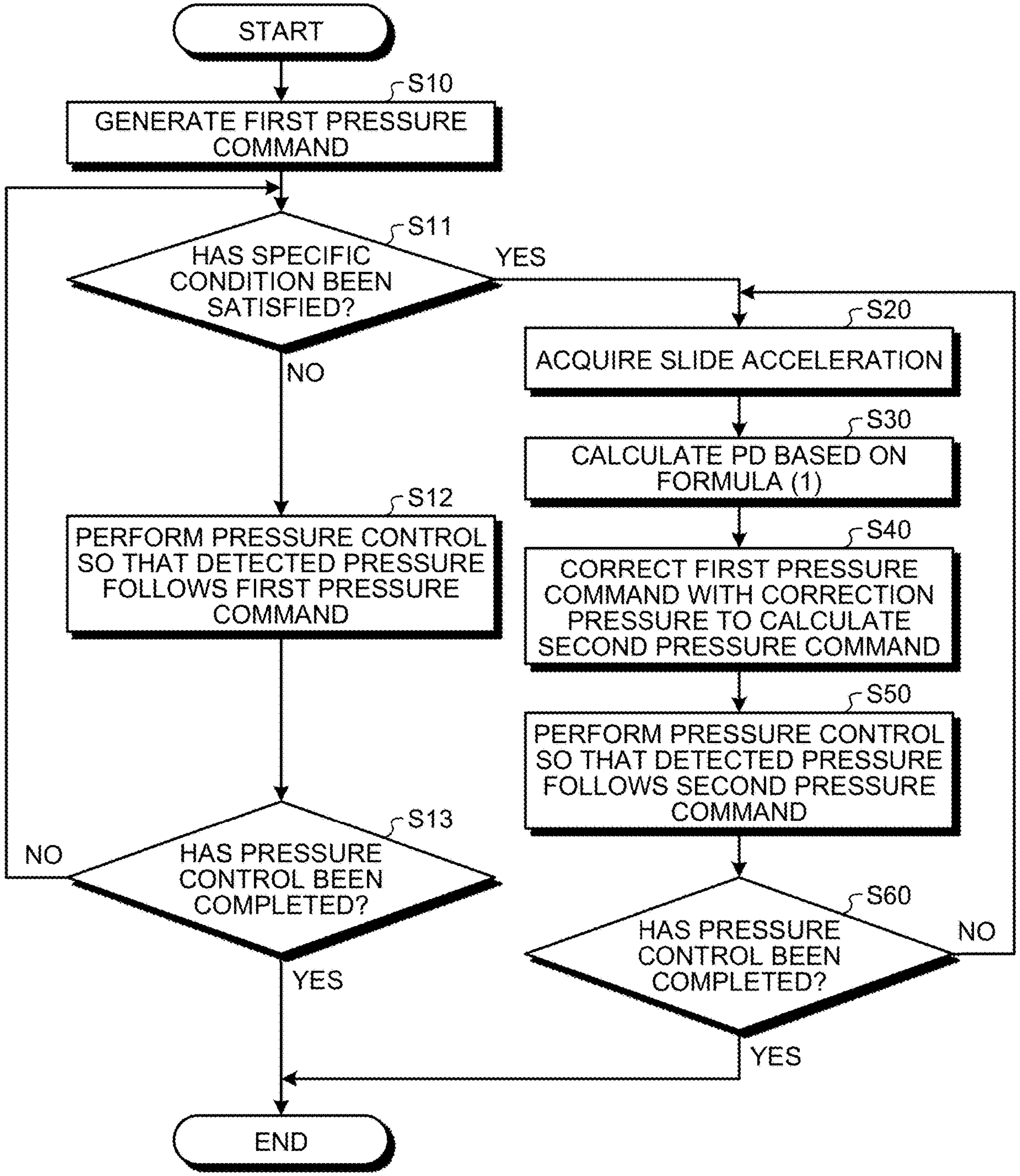
FIG. 9 is a flowchart illustrating a procedure for controlling the die cushion mechanism by the die cushion control device according to the second embodiment.

FIG. 8 is a diagram illustrating a configuration of a processing system including a die cushion control device according to the second embodiment. For components in FIG. 8, components that achieve the same functions as those of the die cushion control device 200A of the first embodiment illustrated in FIG. 1 are denoted by the same reference numerals without duplicated explanations.

Compared with the processing system 101A, a processing system 101B of the second embodiment includes the die cushion control device 200B instead of the die cushion control device 200A. In the die cushion control device 200B of the second embodiment, a pressure command generated by the pressure command generation unit 50 is referred to as a first pressure command P1*b*, and a pressure command generated by a pressure command correction unit 80B is referred to as a second pressure command P2*b*. A pressure value detected by the pressure detector 8 is referred to as a detected pressure P3*b*.

Compared with the die cushion control device 200A, the die cushion control device 200B includes the pressure command correction unit 80B instead of the pressure command correction unit 80A. Compared with the pressure command correction unit 80A, the pressure command correction unit 80B includes a switch 81 and a timing determination unit 83.

The switch 81 selects and switches to a correction value to be used for pressure correction. The switch 81 selects "0" or the correction pressure command 71 sent from the deviation prediction unit 70 as a correction pressure command to be used for pressure correction.

The switch 81 includes a selection switch. The selection switch connects the adder 85 to an A side when "0" is selected, and connects the adder 85 to a B side when connection to the deviation prediction unit 70 is selected. The switch 81 inputs the selected correction pressure command to the adder 85.

In the switch 81, the switch 81 sets the correction pressure command to "0" when the selection switch is on the A side, and sets the correction pressure command 71 sent from the deviation prediction unit 70 as the correction pressure command when the selection switch is on the B side. That is, when the selection switch is on the A side, the first pressure command P1*b* directly becomes the second pressure command P2*b* to be applied to the pressure control unit 30.

Thus, the switch 81 switches between first processing to output the first pressure command P1*b* directly as the second pressure command P2*b* to the pressure control unit 30, and second processing to output the second pressure command P2*b* obtained by correcting the first pressure command P1*b* with the pressure deviation to the pressure control unit 30.

The timing determination unit 83 causes the switch 81 to switch the selection switch. The timing determination unit 83 causes the switch 81 to switch the selection switch from the A side to the B side or from the B side to the A side.

In the switch 81, the selection switch is on the A side at the point in time when the pressure control is started. The timing determination unit 83 causes the switch 81 to switch the selection switch to the B side when a specific time has elapsed or a specific condition is satisfied after the rise of the first pressure command P1*b*. A first example of the specific condition is satisfied when the detected pressure P3*b* decreases and reaches the first pressure command P1*b* that is a target pressure value after the detected pressure P3*b* overshoots and exceeds the first pressure command P1*b*. At this point in time, the timing determination unit 83 causes the switch 81 to switch the selection switch from the A side to the B side.

A second example of the specific condition is satisfied when a specific time has elapsed after the detected pressure P3*b* that has overshot the first pressure command P1*b* decreases and reaches the first pressure command P1*b*. At this point in time, the timing determination unit 83 causes the switch 81 to switch the selection switch from the A side to the B side. Thus, the specific condition may be a combination of the reaching of the detected pressure P3*b* to a specific value (the first pressure command P1*b*) and a lapse of a specific time.

Next, a procedure for controlling the die cushion mechanism 3 with the die cushion control device 200B will be described. FIG. 9 is a flowchart illustrating the procedure for controlling the die cushion mechanism with the die cushion control device according to the second embodiment. For processing illustrated in FIG. 9, description of the same processing as the processing described in FIG. 3 is omitted.

In the die cushion control device 200B, the pressure command generation unit 50 generates the first pressure command P1*b* corresponding to a pressure profile to be generated by the die cushion mechanism 3 at the time of pressing (step S10), and sends the first pressure command P1*b* to the pressure command correction unit 80B.

The pressure command correction unit 80B determines whether or not a specific condition is satisfied (step S11). The specific condition is satisfied, for example, at the point in time when the detected pressure P3*b* exceeds the first pressure command P1*b* and then decreases and reaches the first pressure command P1*b*.

When the specific condition has not been satisfied (step S11, No), the pressure control unit 30 performs pressure control so that the detected pressure P3*b* follows the first pressure command P1*b* (step S12).

The die cushion control device 200B determines whether or not the pressure control has been completed (step S13). When the pressure control has been completed (step S13, Yes), the pressure command generation unit 50 ends the generation of the first pressure command P1*b*. Consequently, the die cushion control device 200B ends operation related to the pressure control.

When the pressure control has not been completed (step S13, No), the die cushion control device 200B returns to the processing in step S11. In this case, the pressure command correction unit 80B determines whether or not the specific condition is satisfied (step S11). When the specific condition has not been satisfied (step S11, No), the die cushion control device 200B executes the processing in steps S12 and S13.

When the specific condition is satisfied (step S11, Yes), the die cushion control device 200B executes the processing in steps S20 to S60. In step S60, the die cushion control device 200B determines whether or not the pressure control has been completed. When the pressure control has not been completed (step S60, No), the die cushion control device 200B returns to the processing in step S20 and repeats the processing in steps S20 to S60.

When the pressure control has been completed (step S60, Yes), the pressure command generation unit 50 ends the generation of the first pressure command P1*b*. Consequently, the die cushion control device 200B ends the operation related to the pressure control.

Here, effects obtained by the die cushion control device 200B controlling the die cushion mechanism 3 will be described with reference to FIG. 10. FIG. 10 is a diagram for explaining pressure waveforms when the die cushion control device according to the second embodiment controls the die cushion mechanism.

Figure 10:
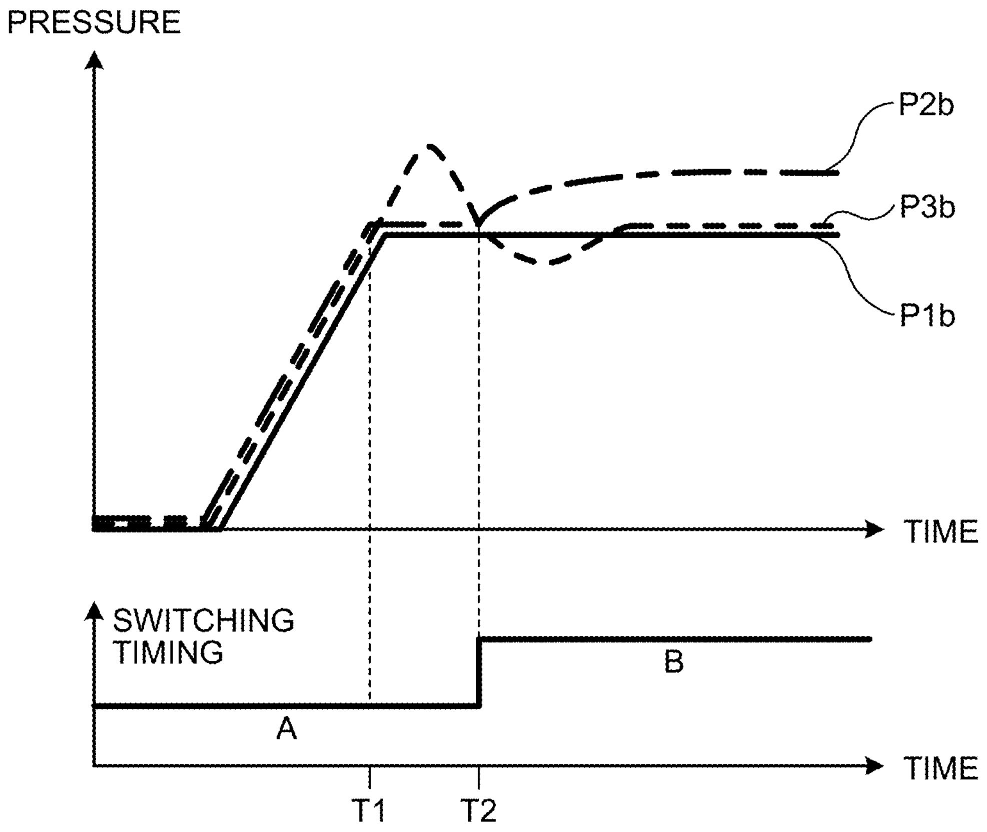
FIG. 10 is a diagram for explaining pressure waveforms when the die cushion control device according to the second embodiment controls the die cushion mechanism.

In FIG. 10, an upper graph shows waveforms related to pressure, and a lower graph shows the state of the selection switch of the switch 81 (the A side or the B side). The horizontal axis of the graph illustrated in the upper part of FIG. 10 represents time, and the vertical axis represents pressure. The upper part of FIG. 10 illustrates a waveform of the first pressure command P1*b* indicated by a solid line, a waveform of the detected pressure P3*b* indicated by a broken line, and a waveform of the second pressure command P2*b* indicated by a dash-dotted line. The horizontal axis of the graph illustrated in the lower part of FIG. 10 represents time, and the vertical axis represents the switching timing of the selection switch.

FIG. 10 illustrates the waveforms when the detected pressure P3*b* overshoots the first pressure command P1*b*, which is a target pressure value, thereby exceeding the first pressure command P1*b* at a timing T1. FIG. 10 illustrates a case where the detected pressure P3*b* exceeds the first pressure command P1*b* and then decreases and reaches the first pressure command P1*b* at a timing T2. In this case, the switch 81 switches the selection switch from the A side to the B side at the timing T2.

While the selection switch is on the A side, the first pressure command P1*b* is not corrected, and the first pressure command P1*b* matches the second pressure command P2*b*. At the timing T2 when the selection switch is switched from the A side to the B side, the pressure command correction unit 80B starts the correction of the first pressure command P1*b* using the correction pressure command 71 predicted by the deviation prediction unit 70, and thus the second pressure command P2*b* becomes larger than the first pressure command P1*b*.

By this switching of the selection switch, the die cushion control device 200B can match the detected pressure P3*b* in the steady-state after the selection switch is switched to the B side, with the first pressure command P1*b* that is a desired pressure command. The die cushion control device 200B does not correct the first pressure command P1*b* immediately after the timing at which the first pressure command P1*b* rises, and thus has the effect of preventing a pressure overshoot occurring at the rise of the first pressure command P1*b* from becoming larger.

Thus, according to the second embodiment, in addition to the effects obtained in the first embodiment, even when a pressure overshoot occurs transiently at the rise of the first pressure command P1*b*, the die cushion control device 200B can prevent the pressure overshoot from becoming larger.

Like the die cushion control device 200A, the die cushion control device 200B can correct the drop of the detected pressure P3*b* occurring in the steady state against the first pressure command P1*b* to an appropriate level while avoiding overcompensation or insufficient compensation.

Third Embodiment

Next, the third embodiment will be described with reference to FIGS. 11 to 15. The die cushion control device 200B of the second embodiment described above delays the timing of applying the correction pressure command 71 generated by the deviation prediction unit 70 predicting the pressure deviation, by a specific timing from the point in time when the first pressure command P1*b* rises. Thus, the die cushion control device 200B corrects a pressure drop in the steady-state without increasing a pressure overshoot.

Although the deviation prediction unit 70 can predict a steady-state pressure drop behavior using formula (1), the detected pressure P3*b* shows a transient behavior during a transient response time (e.g., a period of about some tens of milliseconds) immediately after the switching timing of the switch 81. Therefore, even if the die cushion control device 200B corrects the first pressure command P1*b* with the correction pressure command 71 generated by the deviation prediction unit 70, the detected pressure P3*b* may not be able to follow the first pressure command P1*b* during the transient response time. For example, as illustrated in FIG. 10, at the time immediately after the selection switch is switched from the A side to the B side, a slight deviation occurs between the detected pressure P3*b* and the first pressure command P1*b* corresponding to the desired pressure profile. In this case, the die cushion control device 200B can finely adjust the switching timing to switch the selection switch forward or backward from the timing T2, thereby reducing the deviation between the first pressure command P1*b* and the detected pressure P3*b* during the transient response time immediately after switching of the selection switch.

The die cushion control device 200B of the third embodiment has a function to finely adjust the switching timing of the selection switch. Thus, the die cushion control device 200B of the third embodiment reduces the deviation between the first pressure command P1*b* and the detected pressure P3*b*.

As described above, immediately after switching the selection switch, the detected pressure P3*b* does not exhibit a steady-state behavior but a transient-response behavior. The behavior of the detected pressure P3*b* in the transient response time is affected by various conditions such as the slide speed, control parameters of a pressure control system, the characteristics of the material of the workpiece, the type of the dies, the temperature of the hydraulic fluid used in the hydraulic cylinder 5 driving the die cushion mechanism 3, and the temperature of the hydraulic fluid used in the hydraulic pump 7. An adjustment by trial and error is required when the switching timing to switch the selection switch is finely adjusted under a certain condition to sufficiently reduce the deviation during the transient response time. Even if this adjustment can be made, another adjustment for an appropriate switching timing is required when the type of the workpiece or the type of the dies is changed, or when the temperature of the hydraulic fluid has varied, for example.

In the third embodiment, a learning apparatus 110 to be described later generates a learned model that learns a deviation maximum value that is the maximum value of deviation during a transient response after switching of the selection switch (after the specific condition is satisfied), based on control conditions (inference input data 115A and a switching timing 116A to be described later) used to control the die cushion mechanism 3. Then, an inference apparatus 120 to be described later applies conditions at the time of processing to the learned model to infer the deviation maximum value. Further, the inference apparatus 120 calculates the switching timing 116C optimum for the deviation maximum value, based on the deviation maximum value.

The learning apparatus 110 may be a component of the die cushion control device 200B or may be configured separately from the die cushion control device 200B. The inference apparatus 120 may be a component of the die cushion control device 200B or may be configured separately from the die cushion control device 200B. A switching timing optimum for the deviation maximum value inferred by the inference apparatus 120 (a switching timing 116C to be described later) may be calculated by an apparatus other than the inference apparatus 120.

When the learning apparatus 110 generates the learned model, a user determines the inference input data 115A and the switching timing 116A once. The inference input data 115A and the switching timing 116A are data used to learn the deviation maximum value. The inference input data 115A is data that affects the transient response of the detected pressure P3*b*.

Examples of the inference input data 115A include the slide speed, the control parameters used by the pressure control unit 30, the characteristics of the material of the workpiece, the type of the dies, the temperature of the hydraulic fluid used in the hydraulic cylinder 5, the temperature of the hydraulic fluid used in the hydraulic pump 7, and the first pressure command P1*b*.

The die cushion control device 200B measures the maximum value of the pressure deviation (hereinafter, referred to as the deviation maximum value) during the transient response of about some tens of milliseconds after the switching timing 116A, when the die cushion mechanism 3 is operated using the inference input data 115A and the switching timing 116A. The learning apparatus 110 acquires a data set consisting of the inference input data 115A, the switching timing 116A, and the deviation maximum value in this case. The die cushion control device 200B operates the die cushion mechanism 3 variously changing the inference input data 115A and the switching timing 116A. Thus, the learning apparatus 110 acquires a plurality of data sets. Note that the deviation maximum value may be measured by an apparatus other than the die cushion control device 200B.

When the learned model is represented by a neural network, the learning apparatus 110 calculates optimum weight parameters by applying backpropagation or the like to the plurality of data sets acquired, thereby calculating the learned model. The learning apparatus 110 may calculate the learned model by batch learning, online learning, or the like. Here, an example of using the neural network has been described as a specific example of the learned model, but a model used by the learning apparatus 110 is not limited to the neural network. A model such as a decision tree, a random forest, or a support vector machine may be used. Details of the neural network will be described later.

Figure 11:
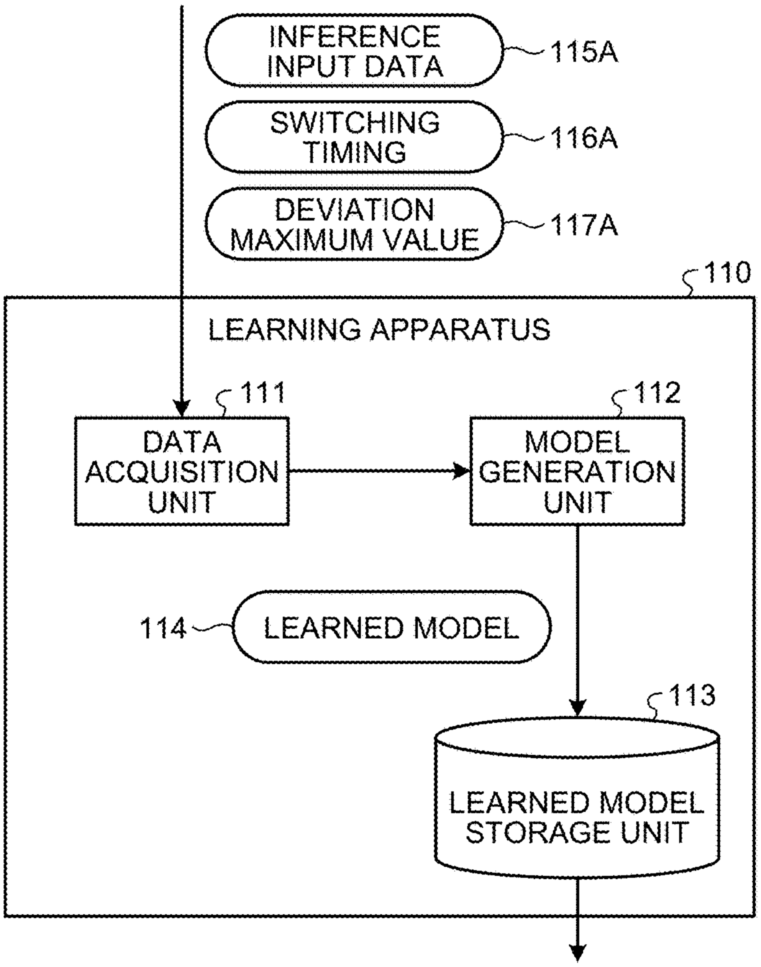
FIG. 11 is a diagram illustrating a configuration of a learning apparatus according to a third embodiment.

FIG. 11 is a diagram illustrating a configuration of the learning apparatus according to the third embodiment. The learning apparatus 110 includes a data acquisition unit 111, a model generation unit 112, and a learned model storage unit 113.

The data acquisition unit 111 has the function of a state observation unit that acquires the inference input data 115A, the switching timing 116A, and a deviation maximum value 117A as training data. Here, the training data is data in which the inference input data 115A, the switching timing 116A, and the deviation maximum value 117A are associated with one another. The data acquisition unit 111 acquires the inference input data 115A, the switching timing 116A, and the deviation maximum value 117A from the die cushion control device 200B. The data acquisition unit 111 generates the training data by associating the inference input data 115A, the switching timing 116A, and the deviation maximum value 117A with one another. The data acquisition unit 111 sends the generated training data to the model generation unit 112.

The model generation unit 112 learns the appropriate deviation maximum value 117A corresponding to the inference input data 115A and the switching timing 116A, based on the training data generated based on a combination of the inference input data 115A, the switching timing 116A, and the deviation maximum value 117A, sent from the data acquisition unit 111. That is, the model generation unit 112 generates the learned model 114 to infer the deviation maximum value 117A corresponding to the inference input data 115A and the switching timing 116A, from the inference input data 115A and the switching timing 116A. The learned model storage unit 113 stores the learned model 114 generated by the model generation unit 112. The learned model 114 stored by the learned model storage unit 113 is read by the inference apparatus 120.

Figure 12:
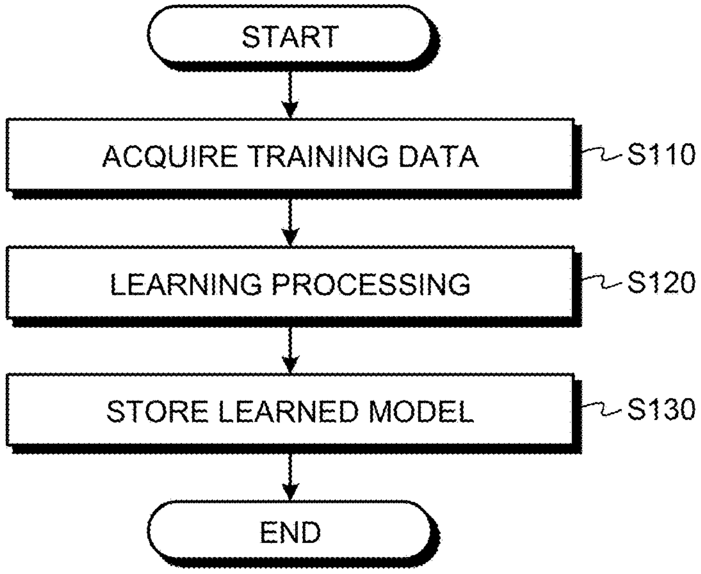
FIG. 12 is a flowchart illustrating a procedure for learning processing by the learning apparatus according to the third embodiment.

Next, a procedure for learning by the learning apparatus 110 will be described with reference to FIG. 12. FIG. 12 is a flowchart illustrating the procedure for learning by the learning apparatus according to the third embodiment.

The data acquisition unit 111 acquires training data (step S110). Specifically, the data acquisition unit 111 acquires the inference input data 115A, the switching timing 116A, and the deviation maximum value 117A as training data.

The model generation unit 112 executes learning processing according to the training data that is a combination of the inference input data 115A, the switching timing 116A, and the deviation maximum value 117A acquired by the data acquisition unit 111 (step S120). For example, according to the training data, the model generation unit 112 generates the learned model 114 by what is called supervised learning.

The learned model storage unit 113 stores the learned model 114 generated by the model generation unit 112 (step S130).

The model generation unit 112 can use a known learning algorithm such as supervised learning. Here, a description when the model generation unit 112 executes supervised learning using a neural network is given.

For example, according to a neural network model, the model generation unit 112 learns the switching timing 116A of the die cushion control device 200B by what is called supervised learning. Here, supervised learning refers to a technique of giving a set of data of inputs and results (labels) to a learning apparatus to learn features in the training data to infer a result from an input.

The neural network is composed of an input layer consisting of a plurality of neurons, an intermediate layer (hidden layer) consisting of a plurality of neurons, and an output layer consisting of a plurality of neurons. The intermediate layer may include one layer or a plurality of layers.

Figure 13:
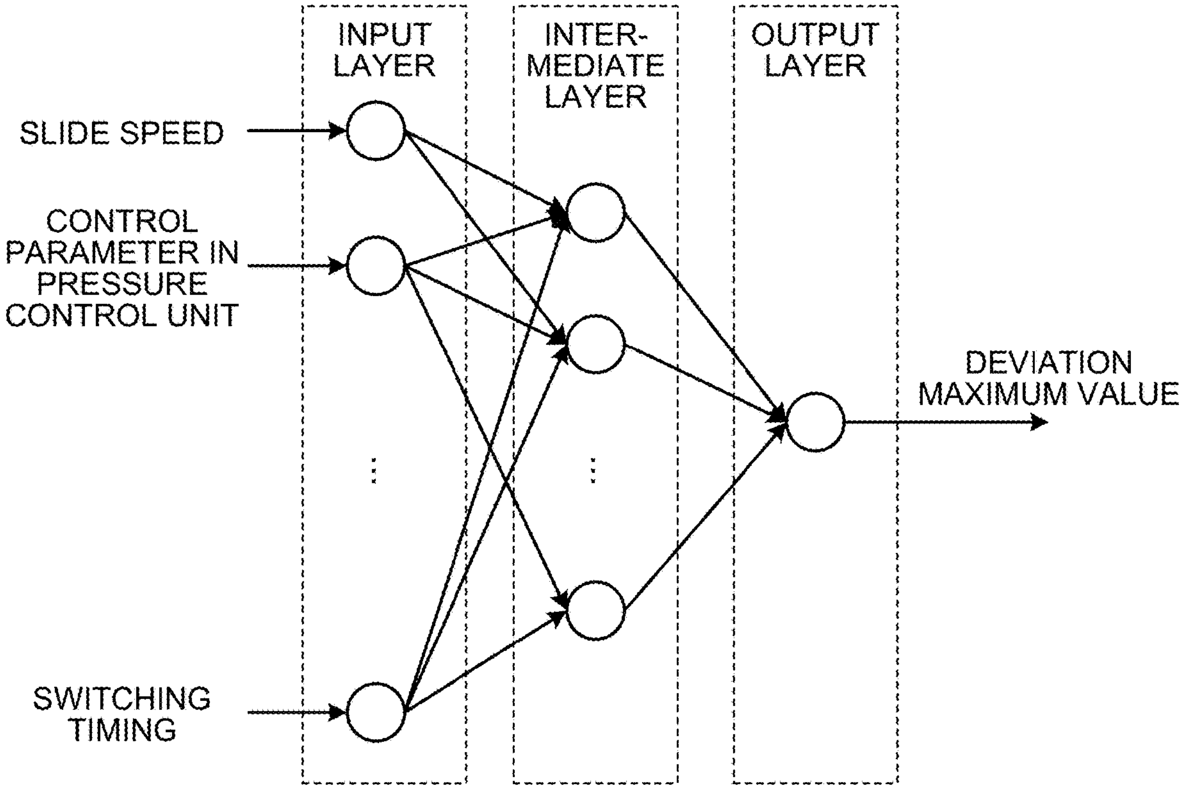
FIG. 13 is a diagram illustrating a configuration of a neural network used by the learning apparatus according to the third embodiment.

FIG. 13 is a diagram illustrating a configuration of the neural network used by the learning apparatus according to the third embodiment. Here, a description is given of a configuration where the learned model 114 is, for example, a three-layer neural network as illustrated in FIG. 13. In the three-layer neural network, when a plurality of pieces of data is input to the input layer, the values of the pieces of data are individually multiplied by parameters called weights and input to the intermediate layer, and each of the results is further multiplied by a weight of the corresponding intermediate layer to be output from the output layer. The output result varies depending on the values of the weights applied to the input to the intermediate layer and the weights applied to the input to the output layer. When the learned model 114 is a neural network, the learning apparatus 110 learns weights.

The neural network of the third embodiment learns the deviation maximum value 117A to be inferred for an object to be produced by what is called supervised learning, according to the training data (data set) generated based on the combination of the inference input data 115A, the switching timing 116A, and the deviation maximum value 117A acquired by the data acquisition unit 111.

That is, the neural network adjusts the weights so that a result output from the output layer by inputting the inference input data 115A and the switching timing 116A to the input layer approaches the deviation maximum value 117A. Thus, the neural network learns the deviation maximum value 117A corresponding to the inference input data 115A and the switching timing 116A. Examples of the inference input data 115A input to the input layer include the slide speed, the control parameters used by the pressure control unit 30, etc.

The model generation unit 112 generates the learned model 114 by executing the learning as described above and outputs the learned model 114. The learned model storage unit 113 stores the learned model 114 output from the model generation unit 112.

As described above, the learning apparatus 110 receives the inference input data 115A and the switching timing 116A in the input layer, further performs calculations via the intermediate layer and the output layer, and finally outputs the deviation maximum value 117A between the first pressure command P1*b* and the detected pressure P3*b* during the transient response.

Next, the inference apparatus 120 will be described. The inference apparatus 120 infers a deviation maximum value 117B to be described later, using the learned model 114. The deviation maximum value 117B calculated by the inference apparatus 120 is the deviation maximum value 117B corresponding to inference input data 115B and a switching timing 116B received by the inference apparatus 120. The inference apparatus 120 calculates the switching timing 116C to be described later based on the deviation maximum value 117B. The die cushion control device 200B uses the switching timing 116C calculated by the inference apparatus 120 in the timing determination unit 83.

Figure 14:
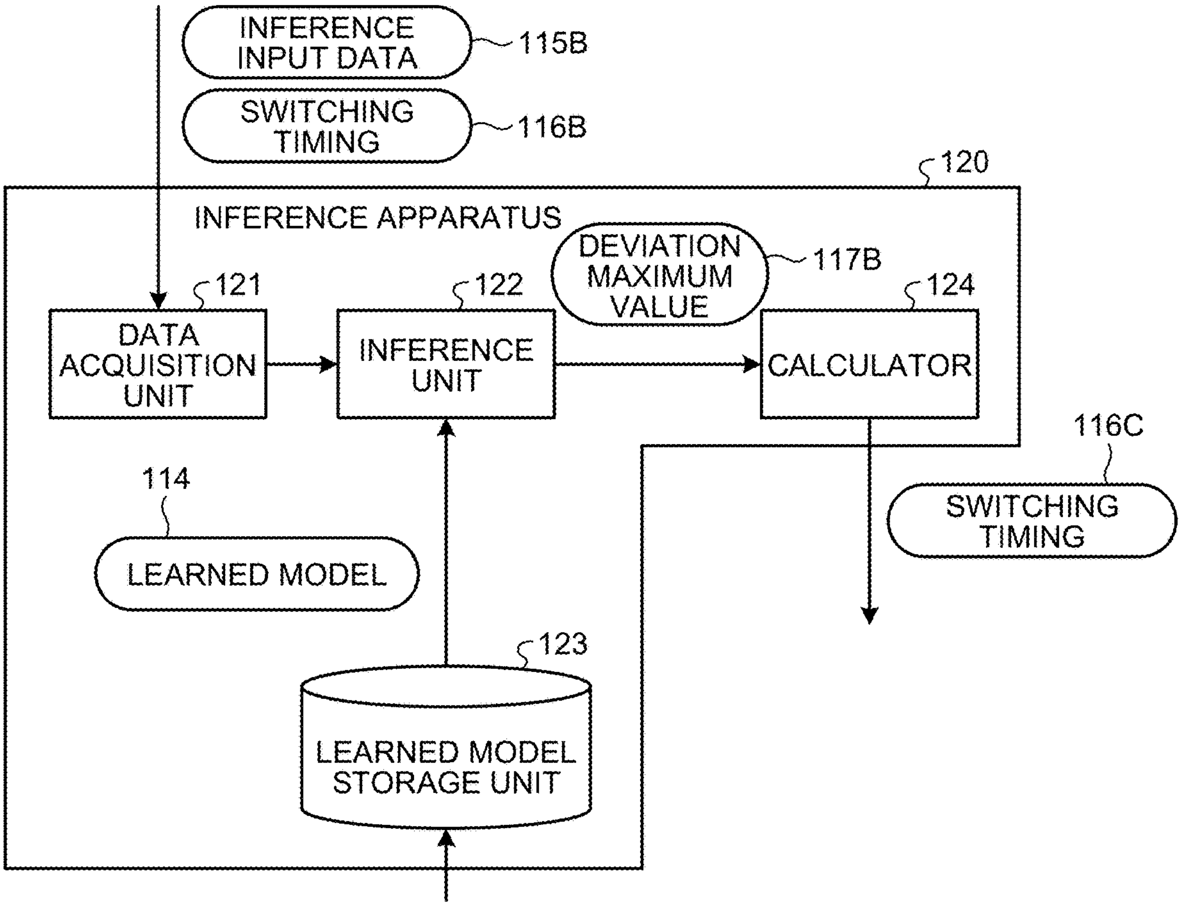
FIG. 14 is a diagram illustrating a configuration of an inference apparatus according to the third embodiment.

FIG. 14 is a diagram illustrating a configuration of the inference apparatus according to the third embodiment. The inference apparatus 120 includes a data acquisition unit 121, an inference unit 122, a learned model storage unit 123, and a calculator 124.

The inference apparatus 120 reads the learned model 114 from the learned model storage unit 113 of the learning apparatus 110 and stores the learned model 114 in the learned model storage unit 123. The data acquisition unit 121 included in the inference apparatus 120 is a first data acquisition unit, and the data acquisition unit 111 included in the learning apparatus 110 is a second data acquisition unit.

The data acquisition unit 121 acquires the inference input data 115B and the switching timing 116B that are data for inferring the deviation maximum value 117B, from the die cushion control device 200B. The inference input data 115B is data like the inference input data 115A, and the switching timing 116B is data like the switching timing 116A. The inference input data 115A and the switching timing 116A are training data used for learning, whereas the inference input data 115B and the switching timing 116B are inference data used to infer the deviation maximum value 117B. The data acquisition unit 121 sends the inference input data 115B and the switching timing 116B acquired to the inference unit 122.

The inference unit 122 reads the learned model 114 from the learned model storage unit 123. The inference unit 122 inputs the inference input data 115B and the switching timing 116B to the learned model 114. Consequently, the learned model 114 infers the deviation maximum value 117B corresponding to the inference input data 115B and the switching timing 116B. That is, the inference unit 122 inputs the inference input data 115B and the switching timing 116B for inferring the deviation maximum value 117B acquired by the data acquisition unit 121 to the learned model 114 for inferring the deviation maximum value 117B. Consequently, the inference unit 122 can calculate the deviation maximum value 117B inferred from the inference input data 115B and the switching timing 116B.

The learned model 114 has learned the relationships among the inference input data 115A, the switching timing 116A, and the deviation maximum value 117A. Thus, the inference unit 122 gives a plurality of switching timings 116B and specific inference input data 115B as inputs to the learned model 114, to calculate a plurality of deviation maximum values 117B corresponding to these conditions. Then, the calculator 124 calculates the switching timing 116C so that the deviation maximum value 117B becomes as small as possible. The calculator 124 outputs the calculated switching timing 116C to the timing determination unit 83 of the pressure command correction unit 80B included in the die cushion control device 200B.

Thus, the inference apparatus 120 calculates the optimum switching timing 116C for the switch 81 to switch the selection switch from the A side to the B side, based on the inference input data 115B, the switching timing 116B, and the learned model 114, and outputs the optimum switching timing 116C to the timing determination unit 83. Consequently, the timing determination unit 83 stores the switching timing 116C. At least one of the learning apparatus 110 or the inference apparatus 120 may be present on a cloud server.

Figure 15:
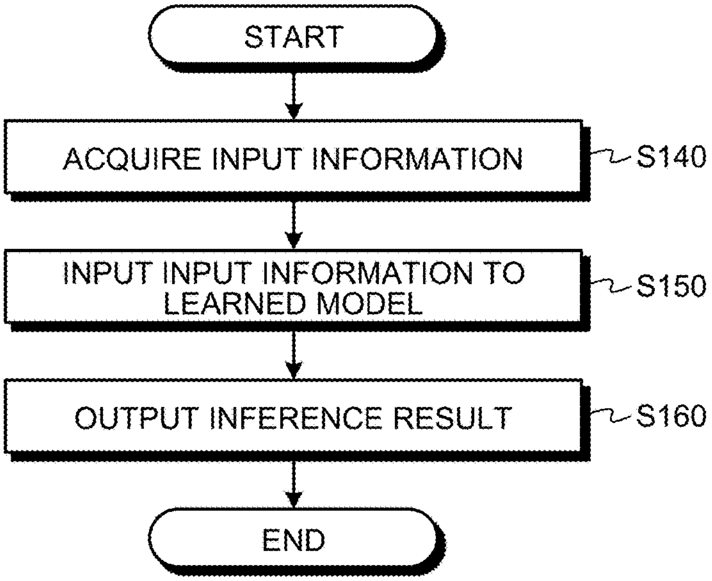
FIG. 15 is a flowchart illustrating a procedure for inference processing by the inference apparatus according to the third embodiment.

Next, a procedure for inference processing by the inference apparatus 120 will be described with reference to FIG. 15. FIG. 15 is a flowchart illustrating the procedure for inference processing by the inference apparatus according to the third embodiment.

The data acquisition unit 121 acquires the inference input data 115B and the switching timing 116B, which are input information, from the die cushion control device 200B (step S140). The inference unit 122 reads the learned model 114 from the learned model storage unit 123. The inference unit 122 inputs the input information to the learned model 114 (step S150). Consequently, the learned model 114 infers the deviation maximum value 117B using the input information, and outputs the deviation maximum value 117B that is the inference result to the calculator 124 (step S160).

The calculator 124 calculates the switching timing 116C corresponding to the deviation maximum value 117B from the deviation maximum value 117B calculated by the inference unit 122. The calculator 124 outputs the calculated switching timing 116C to the timing determination unit 83 of the pressure command correction unit 80B. The timing determination unit 83 causes the switch 81 to perform switching of the selection switch according to the switching timing 116C. In this case, the inference input data 115A used by the die cushion control device 200B is the same data as the inference input data 115B. That is, the die cushion control device 200B uses the inference input data 115B used to calculate the switching timing 116C as new inference input data 115A, and controls the die cushion mechanism 3 using the switching timing 116C corresponding to the inference input data 115B.

When the die cushion control device 200B performs switching of the selection switch according to the switching timing 116C acquired from the inference apparatus 120, the data acquisition unit 111 of the learning apparatus 110 may acquire the inference input data 115A, the switching timing 116A, and the deviation maximum value 117A used, as training data. In this case, the learning apparatus 110 relearns the deviation maximum value 117A corresponding to the inference input data 115A and the switching timing 116A acquired, to update the learned model 114.

Thus, the learning apparatus 110 learns the deviation maximum value 117A, and the inference apparatus 120 infers the deviation maximum value 117B and calculates the switching timing 116C. Then, the die cushion control device 200B controls the die cushion mechanism 3 using the switching timing 116C. Consequently, the die cushion control device 200B can control the die cushion mechanism 3 while causing the die cushion mechanism 3 to follow the first pressure command P1*a* even during the transient response time immediately after the timing at which the switch 81 is switched.

The third embodiment has described the case where supervised learning is applied to the learning algorithm used by the model generation unit 112, but the learning algorithm is not limited to supervised learning. For the learning algorithm, other than supervised learning, reinforcement learning, unsupervised learning, semi-supervised learning, or the like may be applied.

The model generation unit 112 may learn the deviation maximum value 117B according to training data generated for a plurality of die cushion control devices 200B. The model generation unit 112 may acquire training data from a plurality of die cushion control devices 200B used in the same area, to execute learning processing, or may use training data collected from a plurality of die cushion control devices 200B operating independently in different areas, to execute learning processing. A die cushion control device 200B from which to collect training data may be added to objects to be diagnosed or removed from objects to be diagnosed midway. Further, the switching timing 116C calculated using the learned model 114 learned from a certain die cushion control device 200B may be applied to a different die cushion control device 200B.

As the learning algorithm used in the model generation unit 112, deep learning to learn extraction of features themselves may be used. The model generation unit 112 may execute machine learning according to another known method such as genetic programming, functional logic programming, or a support vector machine.

As described above, in the third embodiment, as in the first and second embodiments, the die cushion control device 200B predicts the pressure drop in the steady-state and compensates for the quantity of the drop, and thus can cause the detected pressure P3*b* to follow the first pressure command P1*b* corresponding to the desired pressure profile in the steady state.

The die cushion control device 200B determines the switching timing 116C for the switch 81 to reduce the pressure deviation during the transient response, based on the learned model 114, and thus can reduce the pressure deviation during the transient response immediately after switching of the selection switch.

Further, even when a condition such as the slide speed, the material of the workpiece, the type of the dies, or the temperature of the hydraulic fluid is changed, the learning apparatus 110 has learned the behavior of the pressure deviation corresponding to the condition change, using the learned model 114. The inference apparatus 120 determines the switching timing 116C for the switch 81 based on the learned model 114. Thus, the die cushion control device 200B can reduce the pressure deviation during the transient response.

Here, a hardware configuration of the die cushion control devices 200A and 200B will be described. The die cushion control devices 200A and 200B have the same hardware configuration. Thus, the hardware configuration of the die cushion control device 200A according to the first embodiment will be described here.

Figure 16:
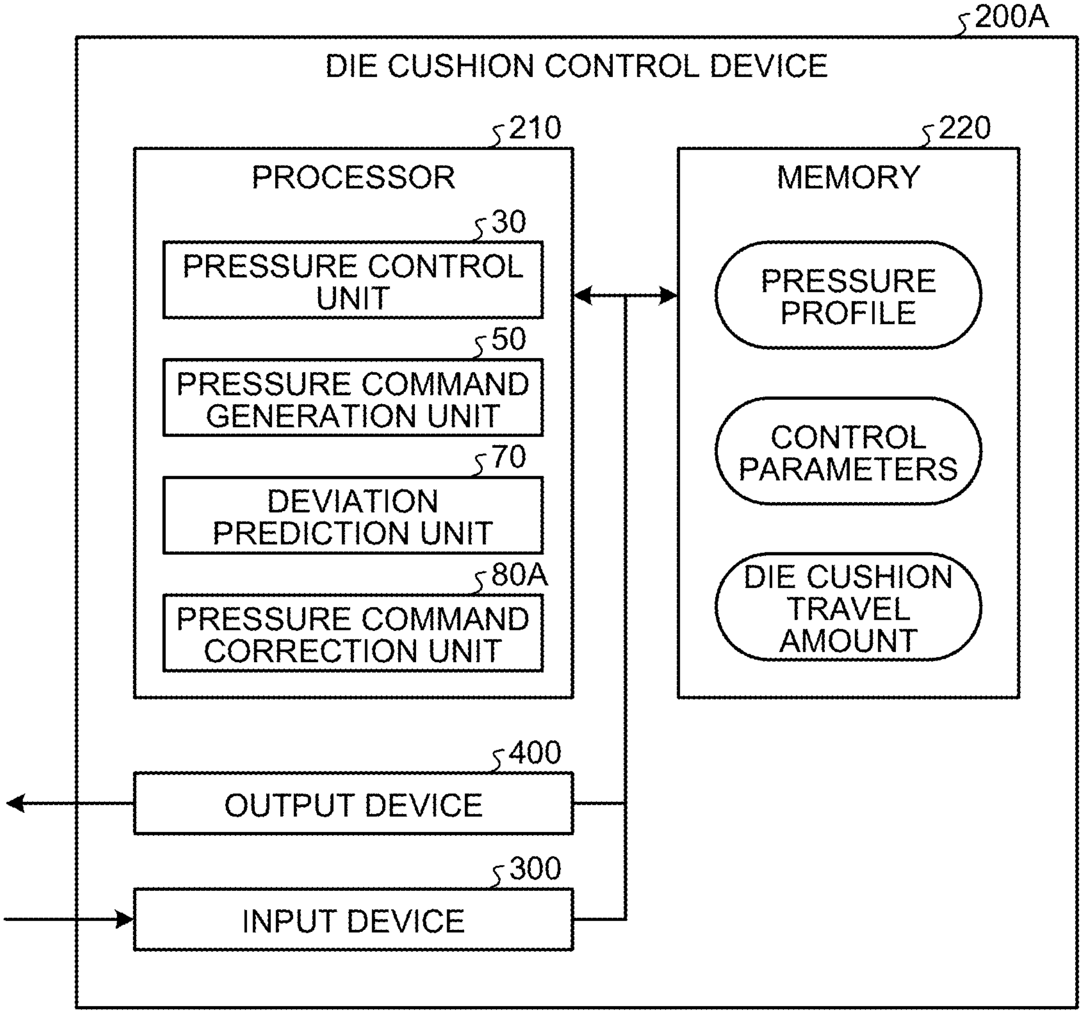
FIG. 16 is a diagram illustrating an example of a hardware configuration for implementing the die cushion control device according to the first embodiment.

FIG. 16 is a diagram illustrating a hardware configuration example for implementing the die cushion control device according to the first embodiment.

The die cushion control device 200A can be implemented by an input device 300, a processor 210, memory 220, and an output device 400. An example of the processor 210 is a central processing unit (CPU, what is called a central processor, a processing unit, an arithmetic unit, a microprocessor, a microcomputer, or a digital signal processor (DSP)), or a system large-scale integration (LSI). Examples of the memory 220 are random-access memory (RAM) and read-only memory (ROM).

The die cushion control device 200A is implemented by the processor 210 reading and executing a computer-executable die cushion control program for performing the operation of the die cushion control device 200A stored in the memory 220. The die cushion control program, which is a program for performing the operation of the die cushion control device 200A, can be said to cause a computer to execute a procedure or a method in the die cushion control device 200A.

The die cushion control program executed by the die cushion control device 200A has a module configuration including the pressure control unit 30, the pressure command generation unit 50, the deviation prediction unit and the pressure command correction unit 80A, which are loaded on the main memory and generated on the main memory.

The input device 300 receives and sends the slide acceleration and the detected pressure P3*a* to the processor 210. The memory 220 is used as temporary memory when the processor 210 executes various types of processing. The memory 220 stores the pressure profile, the control parameters used by the pressure control unit 30, the die cushion travel amount per revolution of the servomotor 10, etc. The output device 400 outputs the motor speed command 24 to the speed control unit 23.

The die cushion control program may be stored on a computer-readable storage medium in an installable-format or executable-format file and provided as a computer program product. The die cushion control program may be provided to the die cushion control device 200A via a network such as the Internet. The functions of the die cushion control device 200A may be partly implemented by dedicated hardware such as dedicated circuitry and partly implemented by software or firmware. The learning apparatus 110 and the inference apparatus 120 can be implemented by the same hardware configuration as the die cushion control device 200A.

The configurations described in the above embodiments illustrate an example and can be combined with another known art. The embodiments can be combined with each other. The configurations can be partly omitted or changed without departing from the gist.

REFERENCE SIGNS LIST

1 slide; 2 slide control unit; 3, 3A die cushion mechanism; 4 cushion pad; 5 hydraulic cylinder; 6 pipe; 7 hydraulic pump; 8 pressure detector; 10 servomotor; 11A, 11B pulley; 12 timing belt; 13 speed reducer; 14 ball screw; 23 speed control unit; 24 motor speed command; 25 drive current; 30 pressure control unit; 41, 42 multiplier; 43 integrator; 44, 85 adder; 45 subtracter; 50 pressure command generation unit; 51, 55, 57 transfer characteristic; 52, 54 motor speed; 53 disturbance velocity; 56 motor position; 60 slide acceleration calculator; 70 deviation prediction unit; 71 correction pressure command; 80A, 80B pressure command correction unit; 81 switch; 83 timing determination unit; machine mechanism; 101A processing system; 110 learning apparatus; 111, 121 data acquisition unit; 112 model generation unit; 113, 123 learned model storage unit; 114 learned model; 115A, 115B inference input data; 116A to 116C switching timing; 117A, 117B deviation maximum value; 120 inference apparatus; 122 inference unit; 124 calculator; 200A, 200B die cushion control device; 210 processor; 220 memory; 300 input device; 400 output device; P1*a*, P1*b* first pressure command; P2*a*, P2*b* second pressure command; P3*a*, P3*b* detected pressure.

The invention claimed is:

1. A die cushion control device to control a die cushion mechanism to generate pressure or force against a slide of a press using a servomotor as a drive source, the die cushion control device comprising:

a first processor; and a first memory to store a first program which, when executed by the first processor, performs processes of:

outputting a first pressure command that is a command on the pressure or the force to be generated between the die cushion mechanism and the slide;

acquiring information on the pressure or the force generated between the die cushion mechanism and the slide as a detected pressure, predicting a pressure deviation that is a difference between the pressure or the force in the first pressure command and the detected pressure caused when the die cushion mechanism is controlled according to the first pressure command, based on translational acceleration of the slide, control parameters used when the pressure or the force of the die cushion mechanism is controlled, and a die cushion travel amount per revolution of the servomotor, and outputting the predicted pressure deviation as a correction pressure command;

correcting the first pressure command with the correction pressure command to calculate a second pressure command; and calculating a speed command to cause the detected pressure to follow the second pressure command, and outputting the speed command to output a drive current corresponding to the speed command to the servomotor.

2. The die cushion control device according to claim 1, wherein the first processor performs proportional-integral control using a proportional gain and an integral gain, and predicts the pressure deviation by dividing the translational acceleration of the slide by the proportional gain, the integral gain, and the die cushion travel amount per revolution of the servomotor.

3. The die cushion control device according to claim 2, wherein the first processor performs switching between first processing to output the first pressure command as the second pressure command, and second processing to output the second pressure command obtained by correcting the first pressure command with the pressure deviation, and the first processor causes the first processing to be executed until a specific condition is satisfied, and switches from the first processing to the second processing when the specific condition is satisfied.

4. The die cushion control device according to claim 3, further comprising an inference apparatus to infer a deviation maximum value that is a maximum value of the pressure deviation at a time of a transient response of the detected pressure after the specific condition is satisfied, the inference apparatus including a second processor; and a second memory to store a second program which, when executed by the second processor, performs processes of:

acquiring control conditions that are conditions used to control the die cushion mechanism, and the deviation maximum value when the die cushion mechanism is controlled using the control conditions, and inferring the deviation maximum value from the control conditions acquired, using a learned model for inferring the deviation maximum value from the control conditions, and calculating a switching timing from the first processing to the second processing for reducing the deviation maximum value during the time of the transient response, based on the inferred deviation maximum value, wherein the first processor switches from the first processing to the second processing at the switching timing.

5. The die cushion control device according to claim 4, further comprising a learning apparatus to generate the learned model, the learning apparatus including a third processor; and a third memory to store a third program which, when executed by the third processor, performs processes of:

acquiring training data including the control conditions and the deviation maximum value, and generating the learned model using the training data.

6. The die cushion control device according to claim 1, wherein the first processor performs switching between first processing to output the first pressure command as the second pressure command, and second processing to output the second pressure command obtained by correcting the first pressure command with the pressure deviation, and the first processor causes the first processing to be executed until a specific condition is satisfied, and switches from the first processing to the second processing when the specific condition is satisfied.

7. The die cushion control device according to claim 6, further comprising an inference apparatus to infer a deviation maximum value that is a maximum value of the pressure deviation at a time of a transient response of the detected pressure after the specific condition is satisfied, the inference apparatus including a second processor; and a second memory to store a second program which, when executed by the second processor, performs processes of:

acquiring control conditions that are conditions used to control the die cushion mechanism, and the deviation maximum value when the die cushion mechanism is controlled using the control conditions, and inferring the deviation maximum value from the control conditions acquired, using a learned model for inferring the deviation maximum value from the control conditions, and calculating a switching timing from the first processing to the second processing for reducing the deviation maximum value during the time of the transient response, based on the inferred deviation maximum value, wherein the first processor switches from the first processing to the second processing at the switching timing.

8. The die cushion control device according to claim 7, further comprising a learning apparatus to generate the learned model, the learning apparatus including a third processor; and a third memory to store a third program which, when executed by the third processor, performs processes of:

acquiring training data including the control conditions and the deviation maximum value, and generating the learned model using the training data.

9. The die cushion control device according to claim 1, wherein the die cushion mechanism is driven using the servomotor, a hydraulic cylinder, and a rotary pump, and the die cushion travel amount per revolution of the servomotor is determined from a value obtained by dividing a discharge volume of hydraulic fluid per revolution of the rotary pump by a pressure-receiving cross-sectional area of the hydraulic cylinder.

10. The die cushion control device according to claim 1, wherein the die cushion mechanism is driven using the servomotor, a ball screw, a timing belt, and a speed reducer, and the die cushion travel amount per revolution of the servomotor is determined from a value obtained by dividing a ball screw pitch that is a travel amount per revolution of the ball screw by a pulley ratio of the timing belt and a reduction ratio of the speed reducer.

11. A die cushion control method to control a die cushion mechanism to generate pressure or force against a slide of a press using a servomotor as a drive source, the die cushion control method comprising:

outputting a first pressure command that is a command on the pressure or the force to be generated between the die cushion mechanism and the slide;

detecting information on the pressure or the force generated between the die cushion mechanism and the slide as a detected pressure;

predicting a pressure deviation that is a difference between the pressure or the force in the first pressure command and the detected pressure caused when the die cushion mechanism is controlled according to the first pressure command, based on translational acceleration of the slide, control parameters used when the pressure or the force of the die cushion mechanism is controlled, and a die cushion travel amount per revolution of the servomotor, and outputting the predicted pressure deviation as a correction pressure command;

correcting the first pressure command with the correction pressure command to calculate a second pressure command; and calculating a speed command to cause the detected pressure to follow the second pressure command to output a drive current corresponding to the speed command to the servomotor.

12. A non-transitory computer readable storage medium storing a die cushion control program to control a die cushion mechanism to generate pressure or force against a slide of a press using a servomotor as a drive source, the die cushion control program causing a computer to perform:

outputting a first pressure command that is a command on the pressure or the force to be generated between the die cushion mechanism and the slide;

detecting information on the pressure or the force generated between the die cushion mechanism and the slide as a detected pressure;

predicting a pressure deviation that is a difference between the pressure or the force in the first pressure command and the detected pressure caused when the die cushion mechanism is controlled according to the first pressure command, based on translational acceleration of the slide, control parameters used when the pressure or the force of the die cushion mechanism is controlled, and a die cushion travel amount per revolution of the servomotor, and outputting the predicted pressure deviation as a correction pressure command;

correcting the first pressure command with the correction pressure command to calculate a second pressure command; and calculating a speed command to cause the detected pressure to follow the second pressure command to output a drive current corresponding to the speed command to the servomotor.

* * * * *